US011522833B2

(12) United States Patent
Jasper et al.

(10) Patent No.: US 11,522,833 B2
(45) Date of Patent: Dec. 6, 2022

(54) USER SECURITY CREDENTIALS AS AN ELEMENT OF FUNCTIONAL SAFETY

(71) Applicant: Rockwell Automation Technologies, Inc., Mayfield Heights, OH (US)

(72) Inventors: Taryl Jasper, Mayfield Heights, OH (US); Kevin Colloton, Milwaukee, WI (US); Joseph P. Izzo, Milwaukee, WI (US); Michael A Bush, Mayfield Heights, OH (US); David P Sullivan, Mayfield Heights, OH (US); Steven Terry Seidlitz, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 183 days.

(21) Appl. No.: 16/894,076

(22) Filed: Jun. 5, 2020

(65) Prior Publication Data

US 2021/0385190 A1 Dec. 9, 2021

(51) Int. Cl.
*H04L 29/00* (2006.01)
*H04L 9/40* (2022.01)
*G05B 19/418* (2006.01)

(52) U.S. Cl.
CPC ...... *H04L 63/0209* (2013.01); *G05B 19/4185* (2013.01); *H04L 63/0807* (2013.01);
(Continued)

(58) Field of Classification Search
CPC ............. H04L 63/0209; H04L 63/0807; H04L 63/0861; H04L 63/105; H04L 63/20;
(Continued)

(56) References Cited

U.S. PATENT DOCUMENTS 7,314,169 B1 1/2008 Jasper et al.
9,699,610 B1 * 7/2017 Chicoine ............... H04W 4/023
(Continued)

OTHER PUBLICATIONS

European Search Report received for EP Patent Application Serial No. 21177374.2 dated Nov. 3, 2021, 9 pages.
(Continued)

*Primary Examiner* — Brandon Hoffman
*Assistant Examiner* — Helai Salehi
(74) *Attorney, Agent, or Firm* — Amin, Turocy & Watson, LLP

(57) ABSTRACT

An industrial safety architecture integrates employee identity and enterprise-level security policy into plant-floor functional safety systems, allowing control and safety systems on the plant floor to regulate safe interactions with hazardous controlled machinery based on user identity or role. The architecture leverages existing employee identity and security policy data maintained on the corporate level of an industrial enterprise to manage identity- and/or role-based control and safety on the plant level. Safety authority systems at both the corporate level and the plant level of the industrial enterprise obtain employee and security policy data from corporate-level systems and provides this data in as SIL-rated manner to industrial control and safety systems on the plant floor, where the identity and security policy information is used by functional safety systems to control access to industrial systems as a function of user identity, role, certifications, or other qualifications.

20 Claims, 25 Drawing Sheets

(52) U.S. Cl.
CPC ........ *H04L 63/0861* (2013.01); *H04L 63/105* (2013.01); *H04L 63/20* (2013.01)

(58) Field of Classification Search
CPC .............. H04L 63/102; G05B 19/4185; G05B 19/0425; G05B 19/418; G05B 2219/36542; G06F 2221/2141; G06F 21/31; G06F 21/6218
See application file for complete search history.

(56) References Cited

U.S. PATENT DOCUMENTS

| | | | |
|---|---|---|---|
| 10,592,882 B1* | 3/2020 | Viswanath | G06Q 20/202 |
| 2016/0034305 A1* | 2/2016 | Shear | G06F 9/50 707/722 |
| 2018/0026954 A1 | 1/2018 | Toepke et al. | |
| 2019/0182260 A1 | 6/2019 | Patel et al. | |

OTHER PUBLICATIONS

Communication pursuant to Rule 69 EPC received for EP Patent Application Serial No. 21177374.2 dated Dec. 13, 2021, 2 pages.
Ghadhab et al., "Is Software Coded Processing an Answer to the Execution Integrity Challenge of Current and Future Automotive Software-Intensive Applications?" (2015) 13 pages.

* cited by examiner

| FIELD | IDENTITY RECORD | |
|---|---|---|
| | VALUE | |
| *NAME* | JAMES ABCD | |
| FACILITY | PLANT B | |
| LOCATION | MACHINE 4 | |
| STATUS | ACTIVE | |
| SHIFT | 1 | |
| *CLASSIFICATION* | MAINTENANCE | |
| TRAINING | PLANT FLOOR, MAINTENANCE, MACHINE SAFETY | |
| GROUP | D | |
| ROLE | MAINTENANCE | |

USER SECURITY CREDENTIALS AS AN ELEMENT OF FUNCTIONAL SAFETY

BACKGROUND

The subject matter disclosed herein relates generally to industrial automation systems, and, more specifically, to industrial functional safety systems.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, comprising an identity provider interface component configured to receive an identity record obtained from a corporate-level employee information system, the identity record defining at least an identity of an employee of an industrial enterprise and a role of the employee; an enrollment component configured to, in response to receipt of validation data indicating approval of the identity record, enroll the identity record as a user credential record defining a degree of access to an automation system granted to the employee; a device interface component configured to receive, from an industrial device associated with the automation system, an identity request that specifies an identity of a user attempting to interact with the automation system; and security token component configured to, in response to determining that the identity specified by the identity request corresponds to the user credential record, generate a security token that, in response to execution on the industrial device, enforces the degree of access to the automation system defined by the user credential record, wherein the device interface component is further configured to send the security token to the industrial device.

Also, one or more embodiments provide a method, comprising receiving, by a safety authority system comprising a processor, an identity record retrieved from a corporate-level employee information system, the identity record defining at least an identity of an employee of an industrial enterprise and a role of the employee; in response to receiving validation data indicating authorization of the identity record, generating, by the safety authority system, a user credential record based on the identity record, wherein the user credential record defines a permitted level of interaction with an automation system granted to the employee; receiving, by the safety authority system from an industrial device associated with the automation system, an identity request that specifies an identity of a user requesting to interact with the automation system; in response to determining that the identity specified by the identity request corresponds to the user credential record, generating, by the safety authority system, a security token that, in response to execution on the industrial device, enforces the permitted level of interaction defined by the user credential record; and sending, by the safety authority system, the security token to the industrial device.

Also, according to one or more embodiments, a non-transitory computer-readable medium is provided having stored thereon instructions that, in response to execution, cause a system to perform operations, the operations comprising receiving an identity record obtained from a corporate-level human resources system, the identity record defining at least an identity of an employee of an industrial enterprise and a role of the employee; in response to receiving validation data indicating that the identity record has been granted administrator approval, generating a user credential record based on the identity record, wherein the user credential record defines a degree of interaction with the automation system granted to the employee; receiving, from an industrial device associated with the automation system, an identity request that includes an identity of a user attempting to interact with the automation system; in response to determining that the identity specified by the identity request corresponds to the user credential record, generating a security token that, in response to execution on the industrial device, enforces the degree of interaction defined by the user credential record; and sending the security token to the industrial device.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 11 is an example identity record that can be generated by identity management component based on employee data and/or security data.

DETAILED DESCRIPTION

Figure 1:
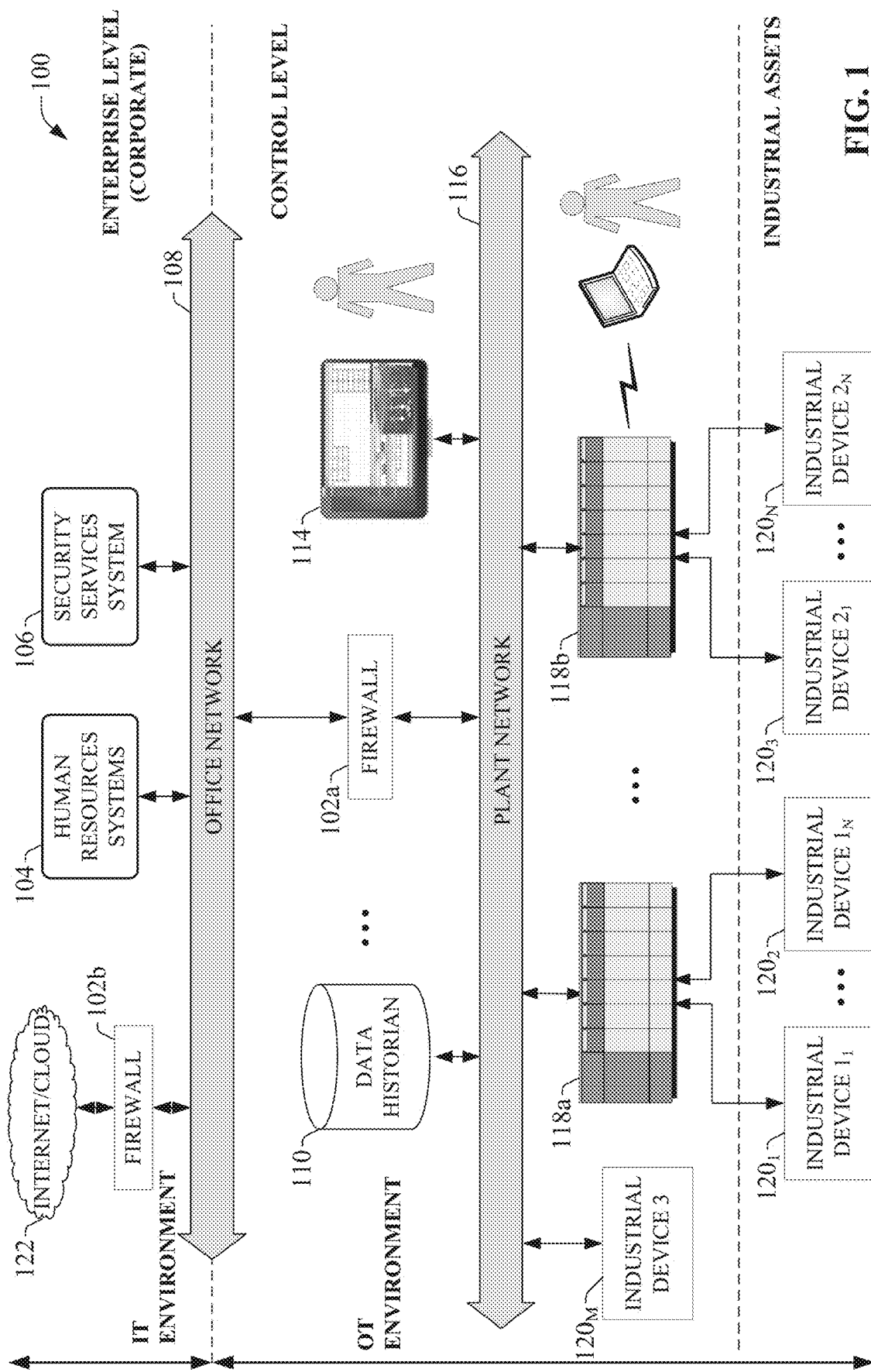
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers, including cloud-based computing systems. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, C++, Python, Javascript, or other such platforms.

FIG. 1 is a block diagram of an example industrial environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or automation systems (e.g., industrial machines). One or more industrial controllers 118 may also comprise a soft controller executed on a personal computer, on a server blade, or another hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers 118, including but not limited to ladder logic, sequential function charts, function block diagrams, structured text, C++, Python, Javascript, etc.

Industrial devices 120 may include input devices that provide data relating to the controlled industrial systems to the industrial controllers 118, output devices that respond to control signals generated by the industrial controllers 118 to control aspects of the industrial systems, or devices that act as both input and output devices. Example input devices can include telemetry devices (e.g., temperature sensors, flow meters, level sensors, pressure sensors, etc), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices (e.g., stack lights or other illuminated indicators, horns, message display boards, etc.), robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired connections or over wired or wireless networks. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, EtherNet/IP, DeviceNet, ControlNet, Data Highway and Data Highway Plus (DH/DH+), Remote I/O, Fieldbus, Modbus, Profibus, wireless networks, serial protocols, OPC UA, field level communications (FLC), and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed-location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 (which may be connected to the plant network 116 directly or via a firewall device 102) or on a cloud platform. Such higher level systems can include, for example, enterprise resource planning (ERP) systems that integrate and collectively manage high-level business operations, such as finance, sales, order management, marketing, human resources, or other such business functions. As another example IT-level system, a Manufacturing Execution System (MES) can monitor and manage control operations on the control level given higher-level business considerations. Reporting systems, which can also reside on the IT level, can collect operational data from industrial devices on the plant floor and generate daily or shift reports that summarize operational statistics of the controlled industrial assets.

An industrial enterprise or business may also operate corporate-level systems on the IT level. Such corporate-level systems can include human resources (HR) systems 104 on which employee records are electronically stored and maintained. An example HR system 104 may comprise one or more servers or databases, or may execute on a secure cloud platform. An example employee record maintained by such HR systems 104 may comprise such information as an employee's name; residential address; hire date; current employment status; a department, facility, or location in which the employee works; a current work shift during which the employee is expected to be on-premises; a classification or role of the employee (e.g., operator, engineer, manager, finance officer, vice president, etc.); training records or certifications held by the employee; or other such employee-specific information. Businesses use such HR systems 104 to track workforce, manage payroll, maintain employee mailing lists, generate reports, or for other purposes.

Some industrial enterprises may also maintain a security services system 106 that defines and enforces enterprise-wide security policies. Similar to HR systems 104, security services systems 106 can operate on one or more servers or on a cloud platform. Security services system 106 can serve as a corporate-level security authority, and in some cases may be integrated with the HR systems 104 in order to define and enforce access security policies for the enterprise; e.g., to define access policies for buildings that make up the industrial enterprise. Such systems 106 may define, for each building of the enterprise, which employees defined in the HR systems 104 are permitted to access that building. The security services system 106 may also interface with the buildings' access control systems to selectively lock or unlock doors of the buildings in accordance with the defined security policies. In this regard, the security services system 106 may control the access control systems such that a door of a given building will only unlock if an employee identification system associated with the door (e.g., a badge reader, a biometric scanner, etc.) receives authenticated employee identification information that corresponds with an employee who is permitted to enter that building per the defined security policy.

Some security services systems 106 may also manage IT-level network security; e.g., by acting as a certificate authority that regulates access to the corporate network (e.g., office network 108).

Returning to the industrial control level within a plant facility, an industrial automation system—comprising one or more industrial controllers 118, associated industrial devices 120, and the machinery that these monitoring and control devices operate—typically include associated safety systems that monitor for potentially unsafe scenarios and transition the automation systems to safe states in response to detection of a potentially hazardous condition. These safety systems can include a number of safety input devices designed to detect when a human has intruded within a protected area near a hazardous machine. Such safety input devices can include, for example, light curtains, photo-eyes, safety mats, optical safety sensors, or other such devices capable of detecting human presence within a protected area or a protected portion of a running machine. The safety input devices can be monitored by a safety relay or safety controller, which can disconnect power from the machine—or otherwise place the machine in a safe state (e.g., a slow operating state)—in response to detecting that one or more of the safety input devices has detected presence of a human within a protected area while the machine is operating.

Industrial safety standards require that these safety systems perform at or above a minimum level of reliability in accordance with a minimum Safety Integrity Level (SIL) defined for the automation system being protected. The minimum SIL requirement for an industrial safety system dictates that the safety system must correctly operate with at least a defined minimum degree of accuracy and repeatability, and must also ensure hazard mitigation even if one or more devices of the safety system experience failures.

While conventional industrial safety systems can reliably mitigate hazards that arise due to human intrusion within a protected area near or within the hazardous machinery, these systems initiate the same safety responses for all intrusions regardless of the identity or role of the detected person. That is, industrial safety systems are not typically designed to consider the identity of a detected person when determining whether to initiate a safety countermeasure (e.g., disconnecting power, placing the protected automation system into a safe operating state, etc.), or when determining what form the safety countermeasure should take. Nor are these safety systems designed to consider role- or identity-specific security policies when formulating a safety response.

Integrating user identity and role-based security policy with industrial control and safety system operation could improve performance of automation systems in a number of ways. For example, an industrial automation system could enforce role-based access to certain protected hazardous areas or control functions, such that employees of a first role (e.g., maintenance personnel) are permitted to initiate certain machine functions that are prohibited to employees of other roles (e.g., operators). This could reduce instances of false trips (e.g., unnecessary initiation of safety actions by the safety system) while authorized maintenance personnel are carrying out maintenance activities on the running system that those personnel are qualified to perform safely.

Role-based security policy can also limit performance of certain control or configuration actions—e.g., machine starting/stopping, changing of control or safety variables or setpoints (e.g., safe limited speed, torque, acceleration, or positioning), resetting of safety functions, etc. —to a limited subset of authorized personnel based on identity or role, thereby improving system performance by customizing control and safety actions according to role. In another example scenario, an industrial safety system that supports role-based security could permit a first subset of authorized personnel to physically access certain hazardous zones while the associated automation system is running, while prohibiting other personnel from entering those zones while the system is running; e.g., by initiating a safety action that places the machinery in a safe state if the safety system detects an unauthorized person within the protected zone, while allowing the machinery to continue operating normally if the safety system detects presence of an authorized person within the protected zone.

In general, integration of identity recognition and security policy into the industrial control domain could yield functionally safe control systems that are flexible and agile, and that tailor their behavior in accordance with the identity or role of the person interacting with these systems.

Figure 2:
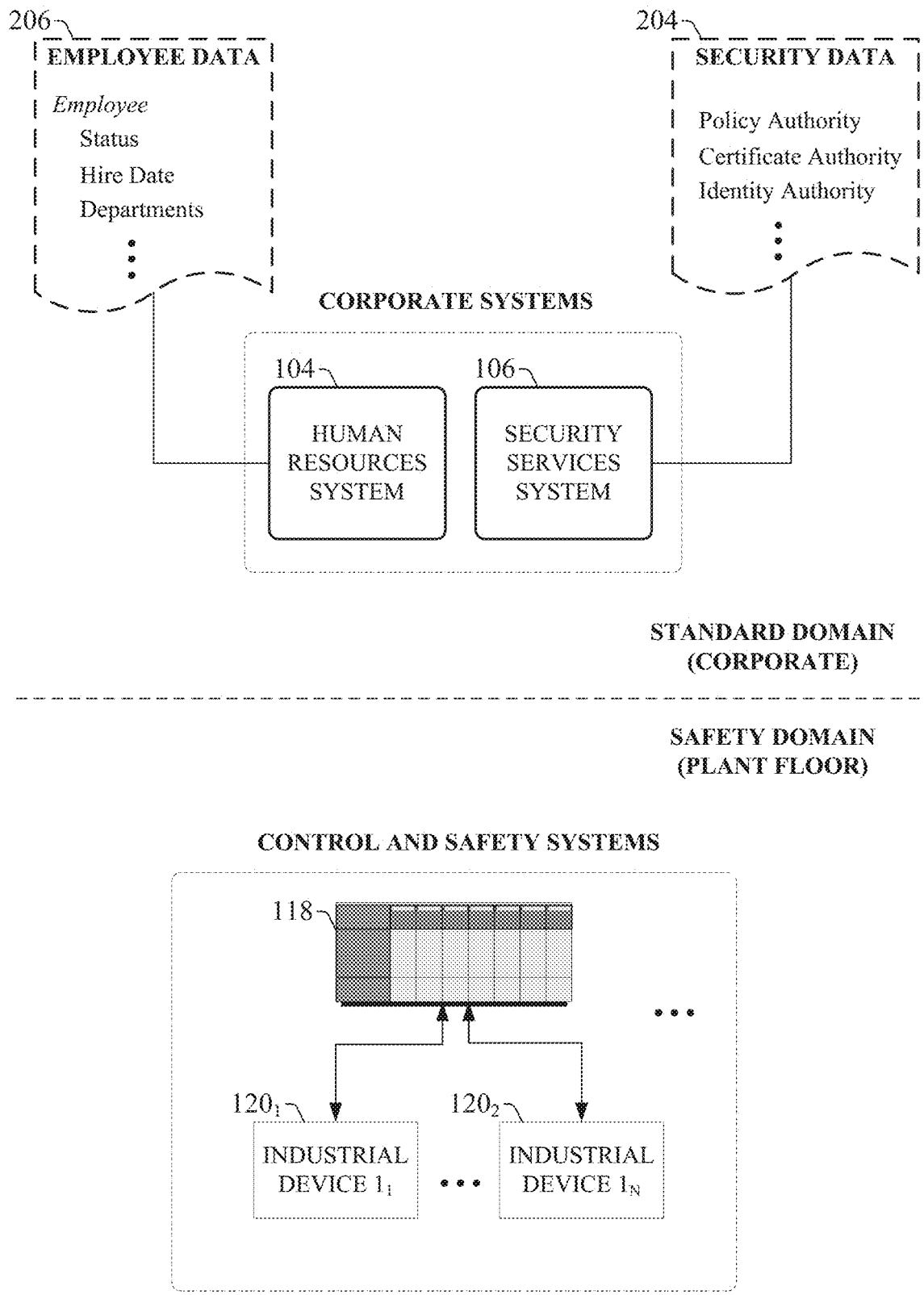
FIG. 2 is a diagram depicting a typical segregation of the standard domain and safety domain of an industrial enterprise.

FIG. 2 is a diagram depicting a typical segregation of the standard domain and safety domain of an industrial enterprise. In general, the standard domain can be viewed as the corporate or enterprise level of the industrial business, comprising the systems and networks that operate in the IT environment of the corporate headquarters (or on a cloud platform accessible from the corporate headquarters via networks 122). Since human resources and security services are typically handled at an enterprise's corporate headquarters, human resource systems 104 and security services systems 106, which maintain employee data 206 and security data 204, respectively, operate in the standard (corporate) domain. The safety domain comprises the industrial automation and safety systems that operate on the plant floor, either in the same building as corporate headquarters or in a separate plant facility located remotely relative to the corporate headquarters. Typically, a clear delineation exists between the standard and safety realms, since industrial automation and safety is handled at the plant floor level, and the corporate level does not interact with manufacturing operations.

As argued above, integration of identity recognition and security policy into the control and safety domain could yield benefits in terms of safety performance, plant-level security, and machine uptime. However, while many industrial businesses leverage user identity and security policy at the corporate level for functions such as building access, workforce tracking, etc. (as discussed above), industrial automation systems on the plant floor (the safety domain) do not typically consider user identity or security policy in their operation, even though consideration of user identity and role could be at least as important in the industrial control realm—given the safety implications—as in human resources and building security.

Figure 3A:
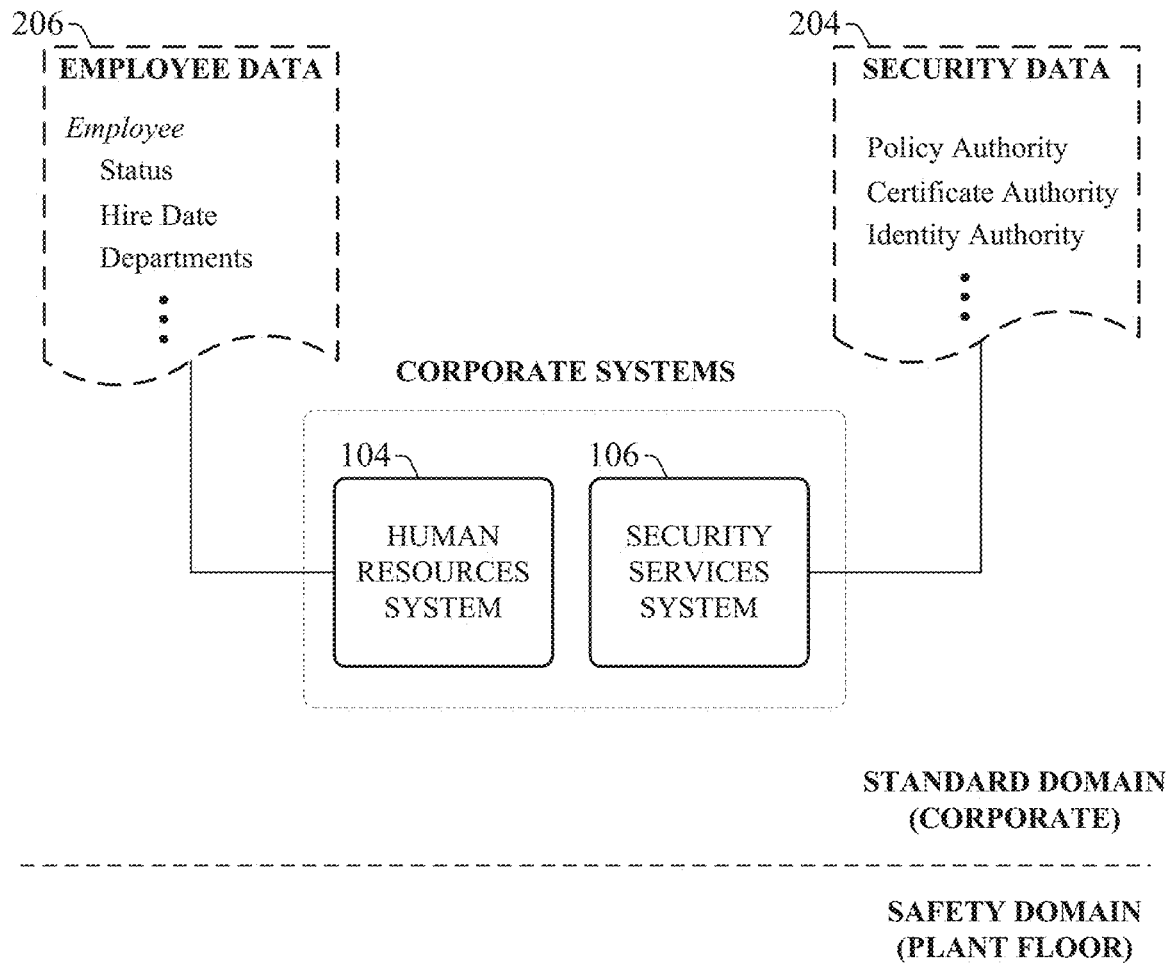
FIG. 3a is a diagram illustrating installation of a safety authority device that maintains employee and security policy data on the plant floor.
Figure 3A:
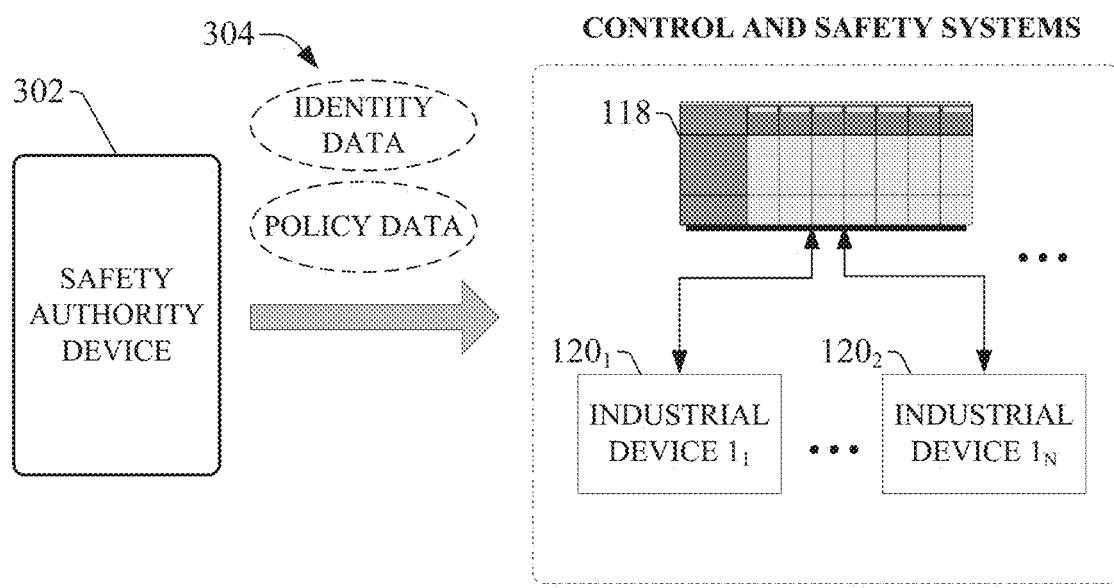

For an automation system (including its associated safety system) to leverage user identity and security policy as proposed above, the industrial control system must have access to employee identity information and associated security policy data. One approach to achieving this—illustrated in FIG. 3a—would be to install a safety authority device 302 on the plant floor (in the safety domain) that maintains employee and security policy data 304. The identity and security policy data 304 stored on the safety authority device 302 could then be provided to the automation systems as needed. Since the employee and security policy data 304 would be maintained solely in the control domain, this information could be persisted and passed to the industrial control systems with safety integrity. However, the employee and security data 304 maintained on such a safety authority device 302 would have to be updated and managed separately from the corporate level systems 104 and 106, even though the safety authority device 302 would store information similar to that stored on those corporate level systems. This would necessitate redundant administrative efforts to ensure that employee data on the plant-floor authority device 302 remains up-to-date with the corporate records, and could result in safety gaps if the device 302 is not regularly updated to reflect changes to the employee records made on the corporate system.

Figure 3B:
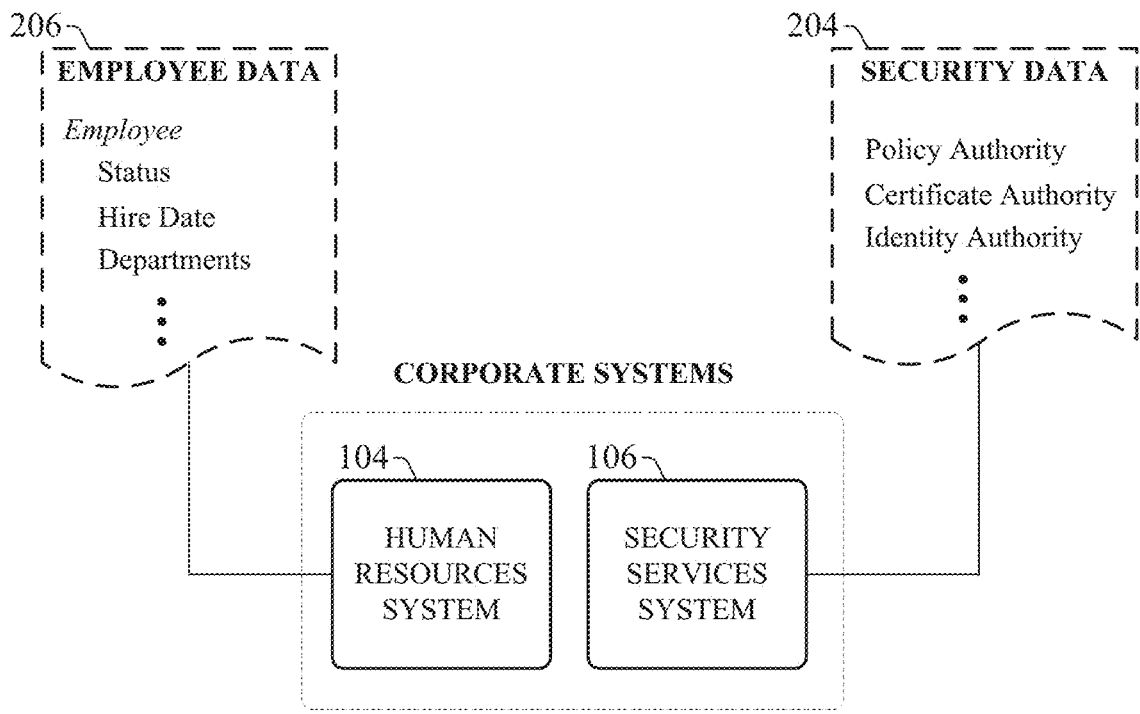
FIG. 3b is a diagram illustrating integration of industrial control and safety systems on the plant floor with the corporate systems.
Figure 3B:
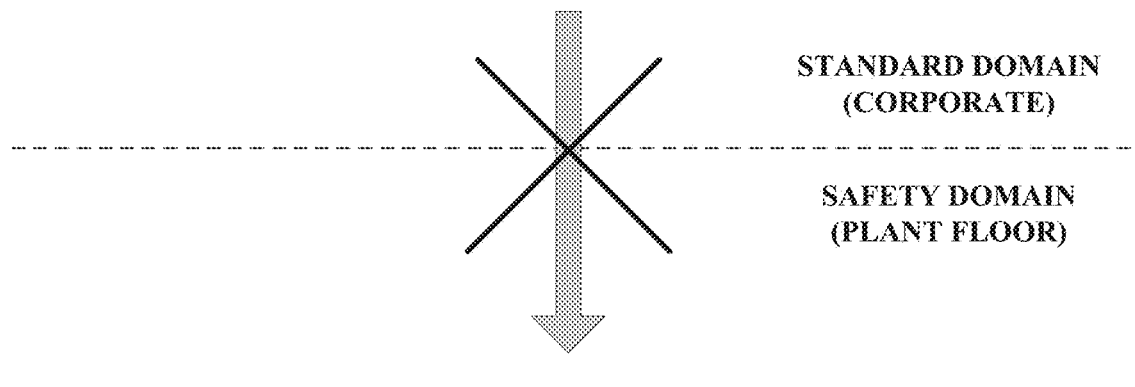
Figure 3B:
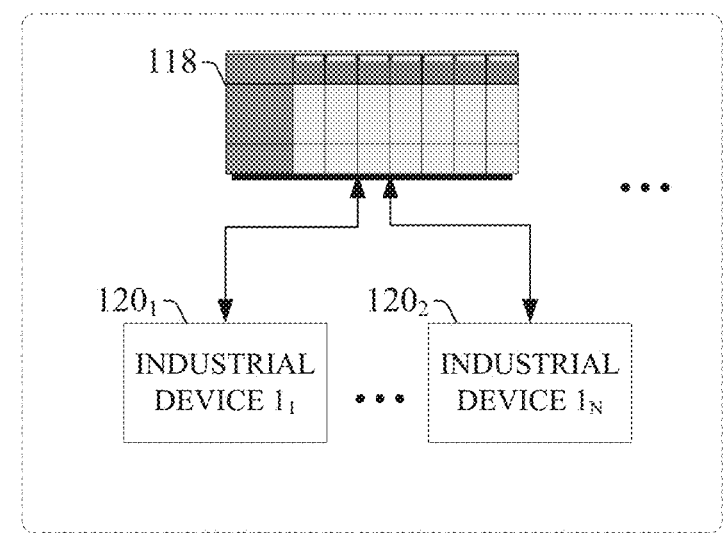

Another approach that would mitigate this issue would be to integrate the industrial control and safety systems with the corporate systems 104 and 106, allowing the existing employee data 206 and security data 204 maintained in the corporate systems 104 and 106 to be provided to the control and safety systems on the plant floor, as illustrated in FIG. 3b. However, while this architecture makes centralized management of identity and security policy data possible, corporate-level systems 104 and 106 are not typically designed to satisfy the safety requirements applicable to functional safety systems (e.g., safety requirements dictated by IEC 61508-2 and -3). Consequently, automation systems on the plant floor cannot be directly interfaced with corporate-level systems in this manner, since the lack of safety integrity on the corporate-level systems could render operation of the automation systems unsafe.

Since there are currently no ways to integrate user authentication—based on corporate-level employee identity data—with functionally safe industrial automation systems, these automation systems cannot consider the identity, role, training level, or other attributes of a user in connection with making safety decisions.

To address these and other issues, one or more embodiments described herein provide a system for integrating security identity and policy with industrial control and safety. Embodiments of the system described herein can leverage existing employee identity and security policy data maintained on the corporate level of an industrial enterprise to manage identity- and/or role-based control and safety on the plant level. In one or more embodiments, safety authority systems residing at the corporate level and the plant level of the industrial enterprise can coordinate to retrieve employee identity and security policy data from corporate-level systems (e.g., human resources and security services systems) and send this information to the plant level in a SIL-rated manner, allowing this data to be used as the basis for role- or identity-based machine control and safety. Regulating functional safety on the plant floor based on user role can allow industrial safety systems to exercise a user-specific or role-specific degree of flexibility while remaining in compliance with SIL safety standards. Moreover, since the industrial safety architecture described herein leverages existing corporate-level employee identity information in connection with managing role-based security on the plant floor, employee identity and security policy can be easily integrated into functional safety on the plant floor, with the corporate-level systems serving as the sole originator of employee identity information.

Figure 4:
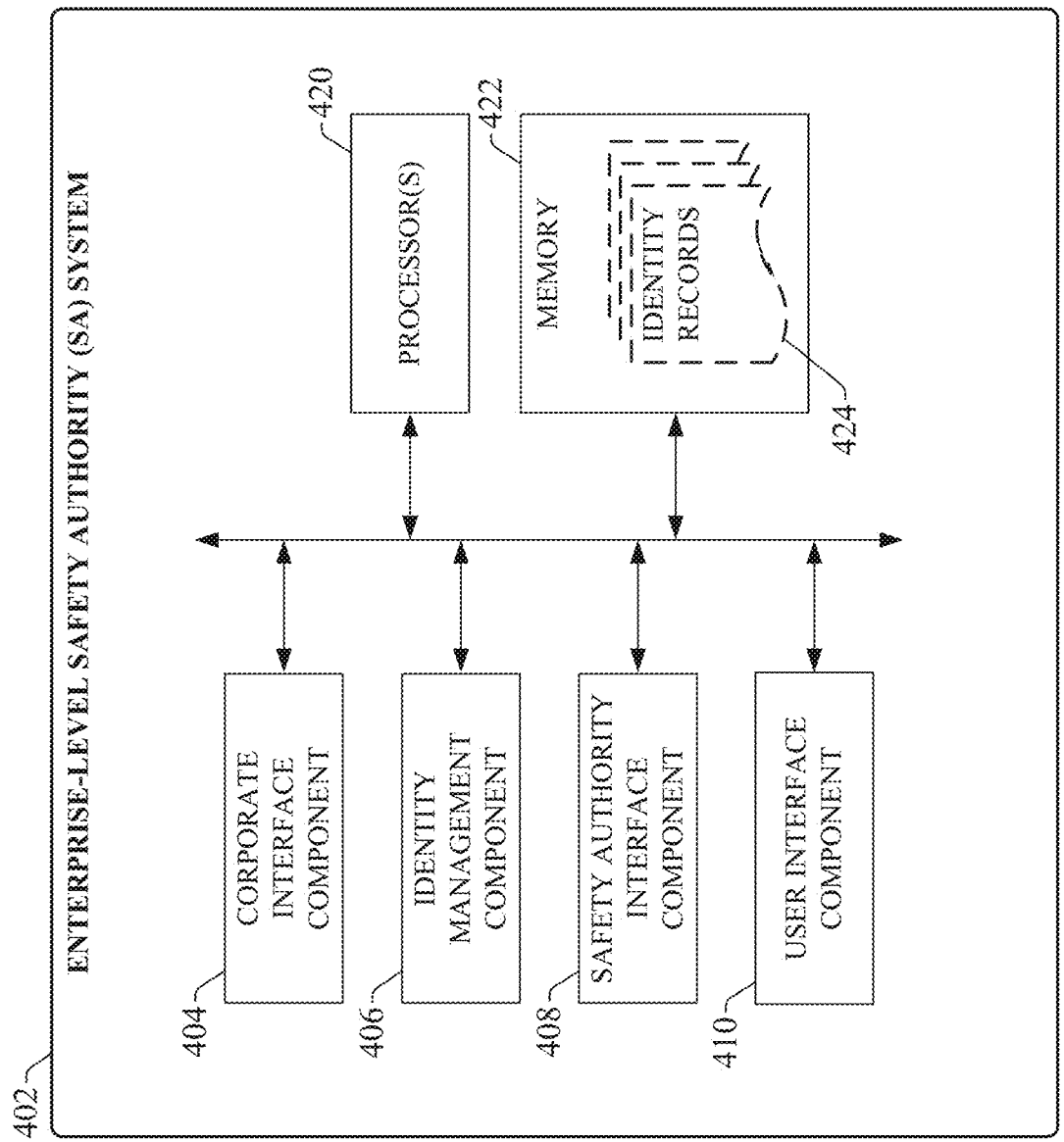
FIG. 4 is a block diagram of an example enterprise-level safety authority (SA) system.

FIG. 4 is a block diagram of an example enterprise-level safety authority (SA) system 402 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Enterprise-level SA system 402 can include a corporate interface component 404, an identity management component 406, a safety authority interface component 408, a user interface component 410, one or more processors 420, and memory 422. In various embodiments, one or more of the corporate interface component 404, identity management component 406, safety authority interface component 408, user interface component 410, the one or more processors 420, and memory 422 can be electrically and/or communicatively coupled to one another to perform one or more of the functions of the enterprise-level SA system 402. In some embodiments, components 404, 406, 408, and 410 can comprise software instructions stored on memory 422 and executed by processor(s) 420. Enterprise-level SA system 402 may also interact with other hardware and/or software components not depicted in FIG. 4. For example, processor(s) 420 may interact with one or more external user interface devices, such as a keyboard, a mouse, a display monitor, a touchscreen, or other such interface devices.

Corporate interface component 404 can be configured to communicatively interface with one or more corporate-level systems, such as human resources systems 104 or security services systems 106, and retrieve employee and security policy information from those systems. Identity management component 406 can be configured to process the employee and security policy information—e.g., by filtering or aggregating the information—and storing the processed employee and security policy information as identity records 424 on memory 422. Safety authority interface component 408 can be configured to communicatively interface with, and send identity records 424 to, a plant-level safety authority system (to be described below).

User interface component 410 can be configured to exchange information between the enterprise-level SA system 402 and a client device having authorization to access the system 402. In some embodiments, user interface component 410 can be configured to generate and deliver interface displays to the client device that allow the user to define processing to be performed by the identity management component 406, to define communication settings for interfacing the enterprise-level SA system 402 with the plant-level SA system, to define employee data filtering criteria, or to set other configuration settings of the system 402.

The one or more processors 420 can perform one or more of the functions described herein with reference to the systems and/or methods disclosed. Memory 422 can be a computer-readable storage medium storing computer-executable instructions and/or information for performing the functions described herein with reference to the systems and/or methods disclosed.

Figure 5:
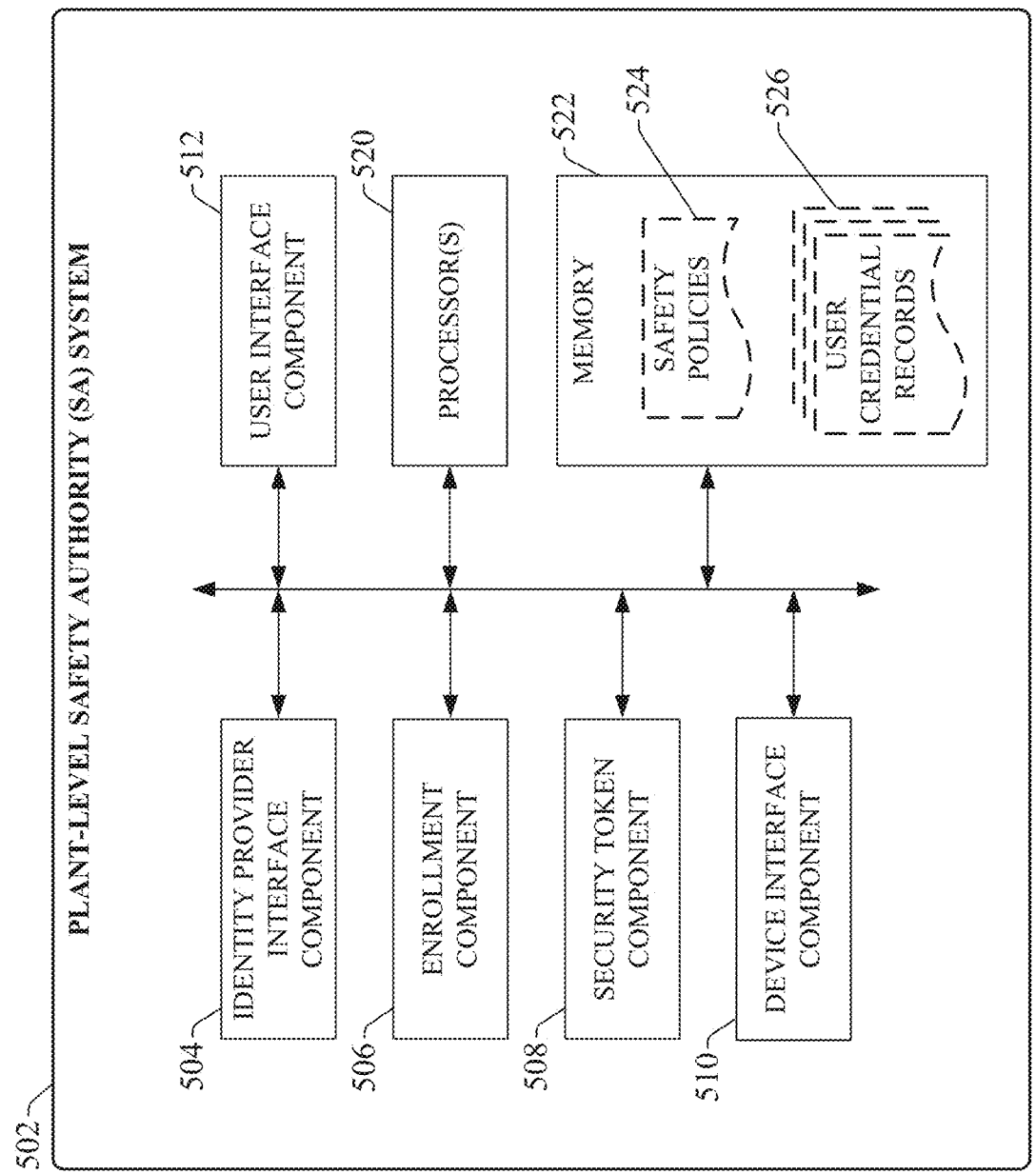
FIG. 5 is a block diagram of an example plant-level safety authority (SA) system.

FIG. 5 is a block diagram of an example plant-level safety authority (SA) system 502 according to one or more embodiments of this disclosure. Plant-level SA system 502 can include an identity provider interface component 504, an enrollment component 506, a security token component 508, a device interface component 510, a user interface component 512, one or more processors 520, and memory 522. In various embodiments, one or more of the identity provider interface component 504, enrollment component 506, security token component 508, device interface component 510, user interface component 512, the one or more processors 520, and memory 522 can be electrically and/or communicatively coupled to one another to perform one or more of the functions of the plant-level SA system 502. In some embodiments, components 504, 506, 508, 510, and 512 can comprise software instructions stored on memory 522 and executed by processor(s) 520. Plant-level SA system 502 may also interact with other hardware and/or software components not depicted in FIG. 5. For example, processor(s) 520 may interact with one or more external user interface devices, such as a keyboard, a mouse, a display monitor, a touchscreen, or other such interface devices. In some embodiments, plant-level SA system 502 can serve as a logical entity that is embedded in another device, including but not limited to an edge device, an industrial controller, or an HMI terminal.

Identity provider interface component 504 can be configured to communicatively interface the plant-level SA system 502 with an enterprise-level SA system 402 residing on a corporate level of an industrial enterprise, or in a cloud platform. Enrollment component 506 can be configured to enroll employee identification information with the system 502 based on identity records 424 received from the enterprise-level SA system 402 and store the enrolled information as user credential records 526.

Security token component 508 can be configured to generate identity- or role-specific security tokens for delivery to an industrial automation system in response to a request from the automation system for user credentials. The security token defines a scope of access to be granted to a given user interacting with the automation system, in term of machine functions the user is permitted to perform or initiate, areas that the user is permitted to access without causing the automation system to initiate a safety response, etc. In some embodiments, the security tokens can also be generated based in part on safety policy data 524 defined and stored on the plant-level SA system 502. Device interface component 510 can be configured to communicatively interface the plant-level SA system 502 with one or more industrial devices of one or more automation systems, allowing the system 502 to receive requests for security tokens from the industrial devices and to deliver security tokens to these devices.

User interface component 512 can be configured to exchange information between the plant-level SA system 502 and a client device having authorization to access the system 502. In some embodiments, user interface component 512 can be configured to generate and deliver interface displays to the client device that allow an authorized administrator to approve or reject identity enrollment requests, to define plant-level safety policy data 524, or to perform other administrative functions.

The one or more processors 520 can perform one or more of the functions described herein with reference to the systems and/or methods disclosed. Memory 522 can be a computer-readable storage medium storing computer-executable instructions and/or information for performing the functions described herein with reference to the systems and/or methods disclosed.

Figure 6:
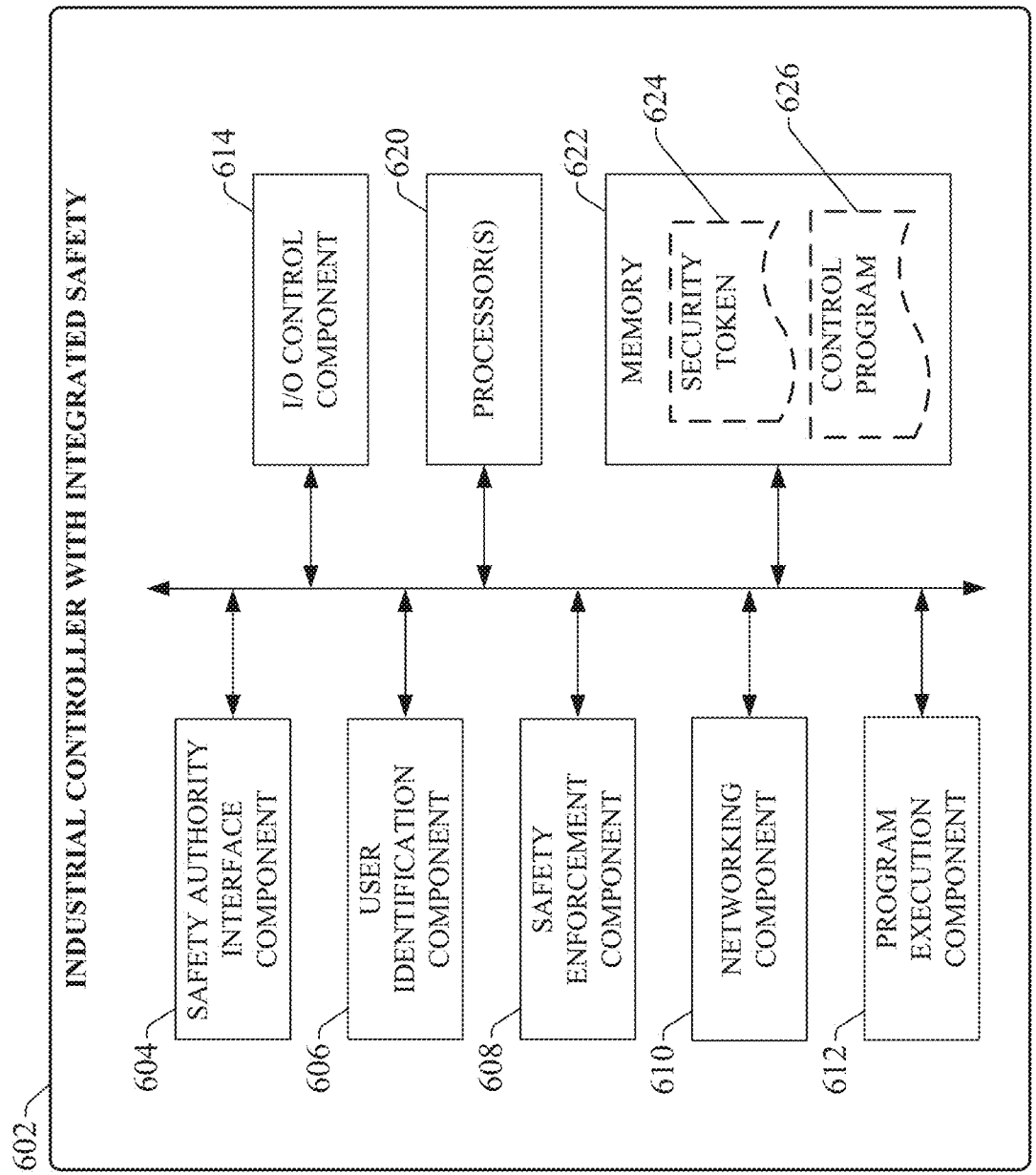
FIG. 6 is a block diagram of an example industrial controller that supports integrated safety.

FIG. 6 is a block diagram of an example industrial controller 602 that supports integrated safety according to one or more embodiments of this disclosure. Although the industrial device depicted in FIG. 6 and described herein is assumed to be an industrial controller, such as a PLC or another type of controller, some or all of the identity-based safety components described in connection with FIG. 6 can also be implemented in other types of monitoring and/or control devices that operate as part of an industrial automation system or associated safety system, including but not limited to a safety relay or safety controller, a motor drive, an HMI terminal, a vision system, an industrial optical scanner, or other such device or system.

Industrial controller 602 can include a safety authority interface component 604, a user identification component 606, a safety enforcement component 608, a networking component 610, a program execution component 612, an I/O control component 614, one or more processors 620, and memory 622. In various embodiments, one or more of the safety authority interface component, user identification component 606, safety enforcement component 608, networking component 610, program execution component 612, I/O control component 614, the one or more processors 620, and memory 622 can be electrically and/or communicatively coupled to one another to perform one or more of the functions of the industrial controller 602. In some embodiments, components 604, 606, 608, 610, 612, and 614 can comprise software instructions stored on memory 622 and executed by processor(s) 620. Industrial controller 602 may also interact with other hardware and/or software components not depicted in FIG. 6. For example, processor(s) 620 may interact with one or more external user interface devices, such as a keyboard, a mouse, a display monitor, a touchscreen, or other such interface devices.

Safety authority interface component 604 can be configured to communicatively interface with a plant-level SA system 502 to facilitate exchange of data between the industrial controller 602 and the SA system 502. This exchange of data can include, for example, sending of user identity information from the industrial device to the SA system 502 and receipt of identity-specific security tokens 624. User identification component 606 can be configured to receive authenticated user identity information that uniquely identifies a user attempting to interact with the automation system of which industrial controller 602 is a component. In some implementations, this user identity information can be received from a dedicated identification device, and can comprise, for example, a user name and password combination, data read from a badge carried by the user (e.g., a radio-frequency identifier tag, a magnetic strip, etc.), biometric data, data stored on a personal device carried by the user (e.g., a universal serial bus device), or other suitable identification data.

Safety enforcement component 608 can be configured to control operation of the industrial controller 602 in a manner consistent with the scope of access permitted by the security token 624 received from the plant-level SA system 502 and stored on memory 622. This can include, for example, permitting or denying requested actions attempted by the user relative to the automation system, such as initiating a machine operating mode, modifying a control variable or configuration setting, accessing a protected safety zone without causing the safety system to initiate a safety action, or other such actions.

Networking component 610 can be configured to exchange data with one or more external devices over a wired or wireless network using any suitable network protocol. Program execution component 612 can be configured to compile and execute a user-defined control program 626 or executable interpreted code. In various embodiments, the control program 626 can be written in any suitable programming format (e.g., ladder logic, sequential function charts, structured text, C++, Python, Javascript, etc.) and downloaded to the industrial controller 602. Typically, the control program 626 uses data values read by the industrial device's analog and digital inputs as input variables, or received via network component 610, and sets values of the industrial device's analog and digital outputs (or sets values of networked outputs) in accordance with the control program instructions based in part on the input values. In some scenarios, safety enforcement component 608 may limit execution of one or more routines defined by the control program 626 based on the user-specific scope of access permitted by security token 624.

I/O control component 614 can be configured to control the electrical output signals of the industrial device's digital and analog electrical outputs in accordance with the control program outputs, and to convert electrical signals on the industrial device's analog and digital inputs to data values that can be processed by the program execution component 612.

The one or more processors 620 can perform one or more of the functions described herein with reference to the systems and/or methods disclosed. Memory 622 can be a computer-readable storage medium storing computer-executable instructions and/or information for performing the functions described herein with reference to the systems and/or methods disclosed.

Figure 7:
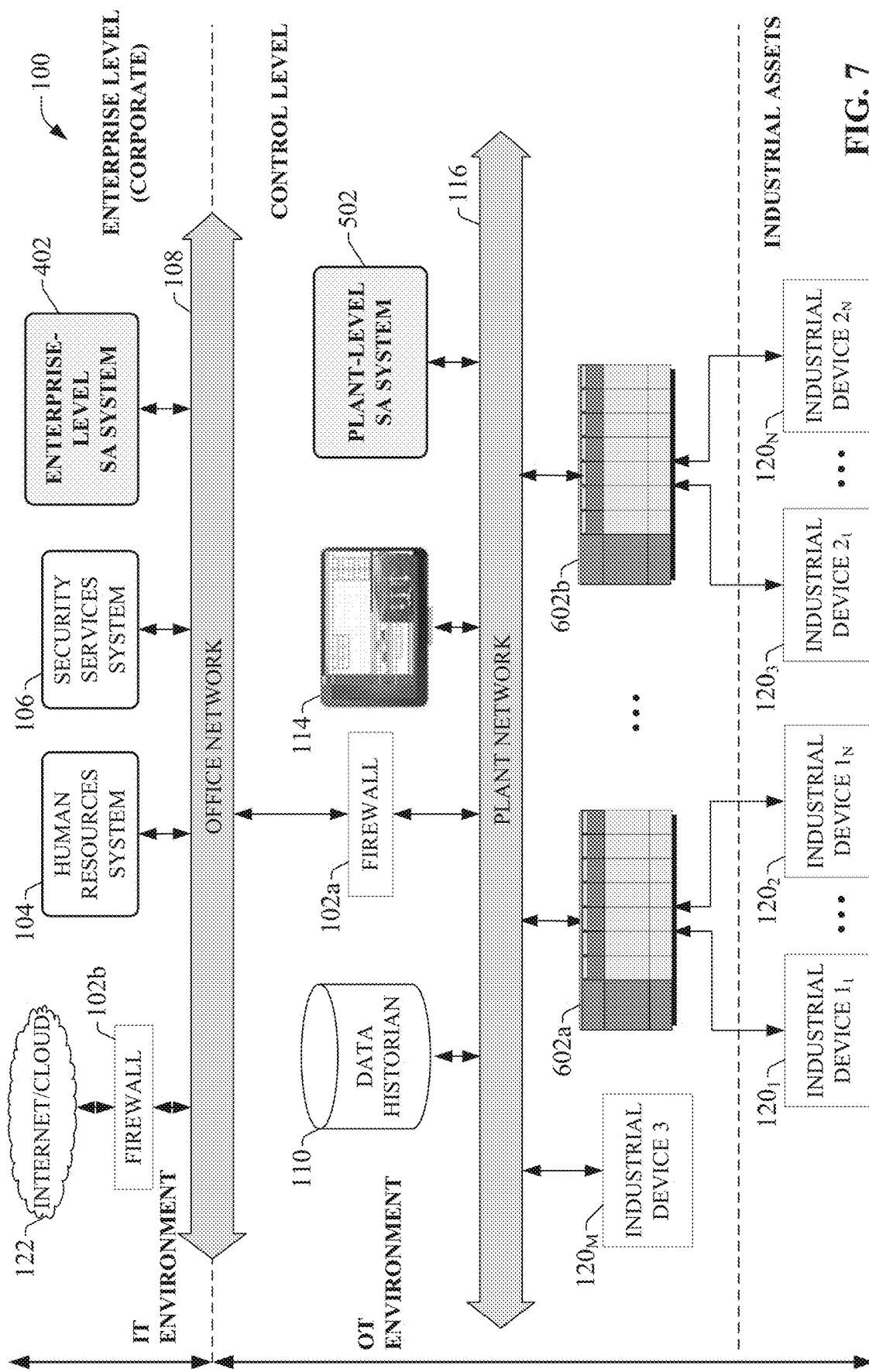
FIG. 7 is a block diagram of an example industrial environment in which an enterprise-level SA system and a plant-level SA system are added for integration of identity and security policy with industrial control.

FIG. 7 is a block diagram of the example industrial environment 100 depicted in FIG. 1, in which an enterprise-level SA system 402 and a plant-level SA system 502 are added to the architecture for integration of identity and security policy with industrial control. In this example architecture, an enterprise-level SA system 402 resides on the enterprise or corporate level of the industrial enterprise and is networked to human resources system 104 and security service system 106 over office network 108. However, in some architectures, one or more of the enterprise-level SA system 402, the human resources system 104, or the security services system 106 may execute as cloud-based services on a cloud platform accessible via networks 122.

On the plant floor, a plant-level SA system 502 has been installed on plant network 116, allowing the plant-level SA system 502 to communicate with industrial controller 602— e.g., industrial controllers 602a and 602b—over the network 116. In the illustrated example, data can be routed between plant network 116 and office network 108 via a firewall device 102a, allowing enterprise-level SA system 402 and plant-level SA system 502 to communicate across the networks (and any intervening networks not depicted in FIG. 7). Depending on the layout of the industrial enterprise, the enterprise level may reside within the same facility as the control level. That is, the corporate headquarters and its associated corporate-level systems—including human resources system 104 and security services system 106— may reside and operate within an area of the same plant facility in which the control systems operate. Alternatively, the corporate headquarters may reside in a separate facility remote from the plant facility. In such scenarios, plant-level SA system 502 may be configured to communicate with the enterprise-level SA system 402 over a public network securely accessible via firewall 102a, such as the Internet.

Figure 8:
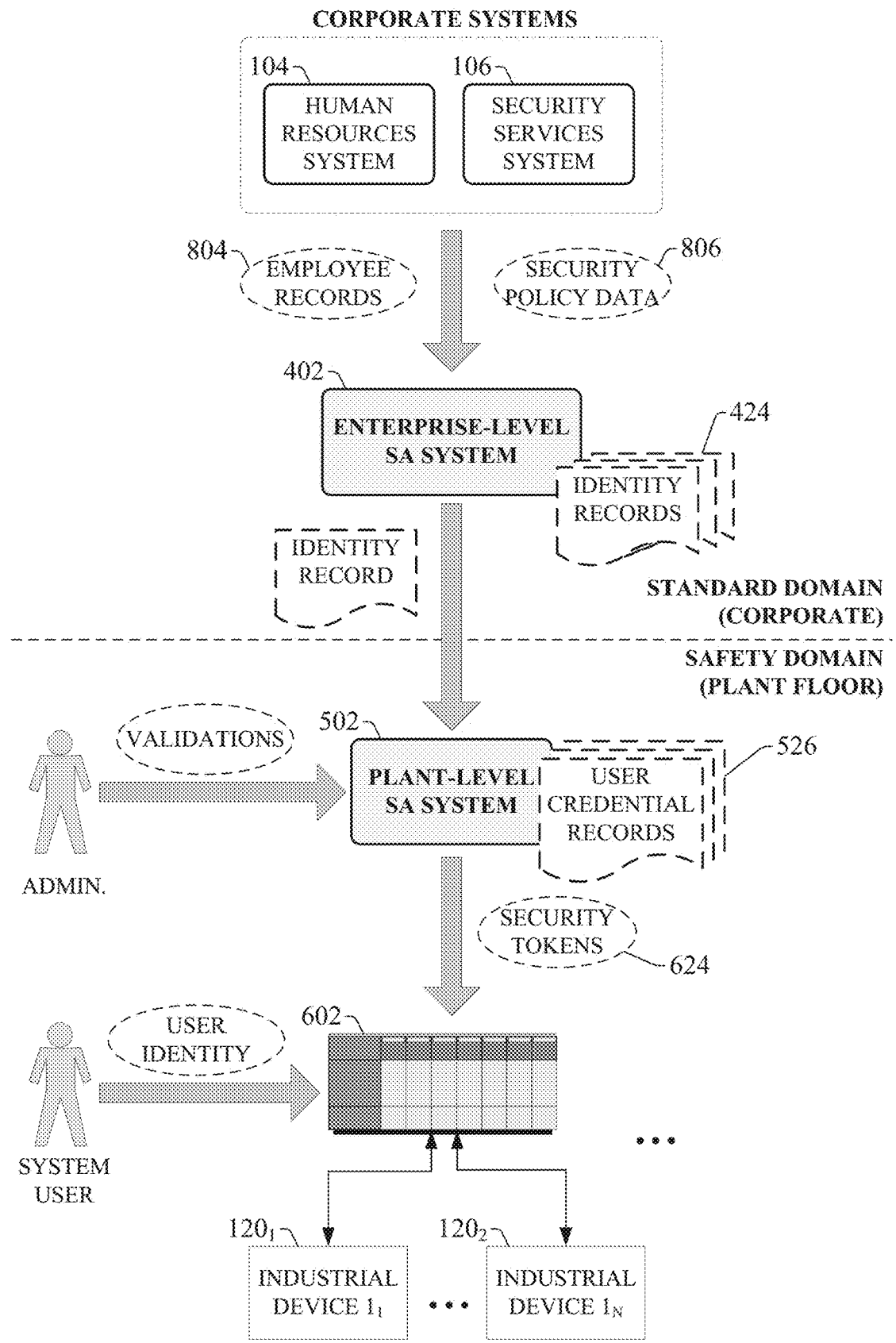
FIG. 8 is a diagram illustrating a high-level overview of generalized data flows implemented by embodiments of the enterprise-level SA system and plant-level SA system to facilitate integration of identity and security policy into plant-floor control and safety.

FIG. 8 is a diagram illustrating a high-level overview of generalized data flows implemented by embodiments of the enterprise-level SA system 402 and plant-level SA system 502 to facilitate integration of identity and security policy into plant-floor control and safety. This figure depicts the generalized architecture by which the SA systems 402 and 502 integrate existing corporate-level employee and security policy data with control and safety systems on the plant floor. In general, the enterprise-level SA system 402 and plant-level SA system 502 serve as the two major elements of the integration system, which bridge the standard and safety domains in order to integrate identity and security policy into the control and safety level while providing necessary isolation and configurability required by the plant-level automation systems.

Figure 9:
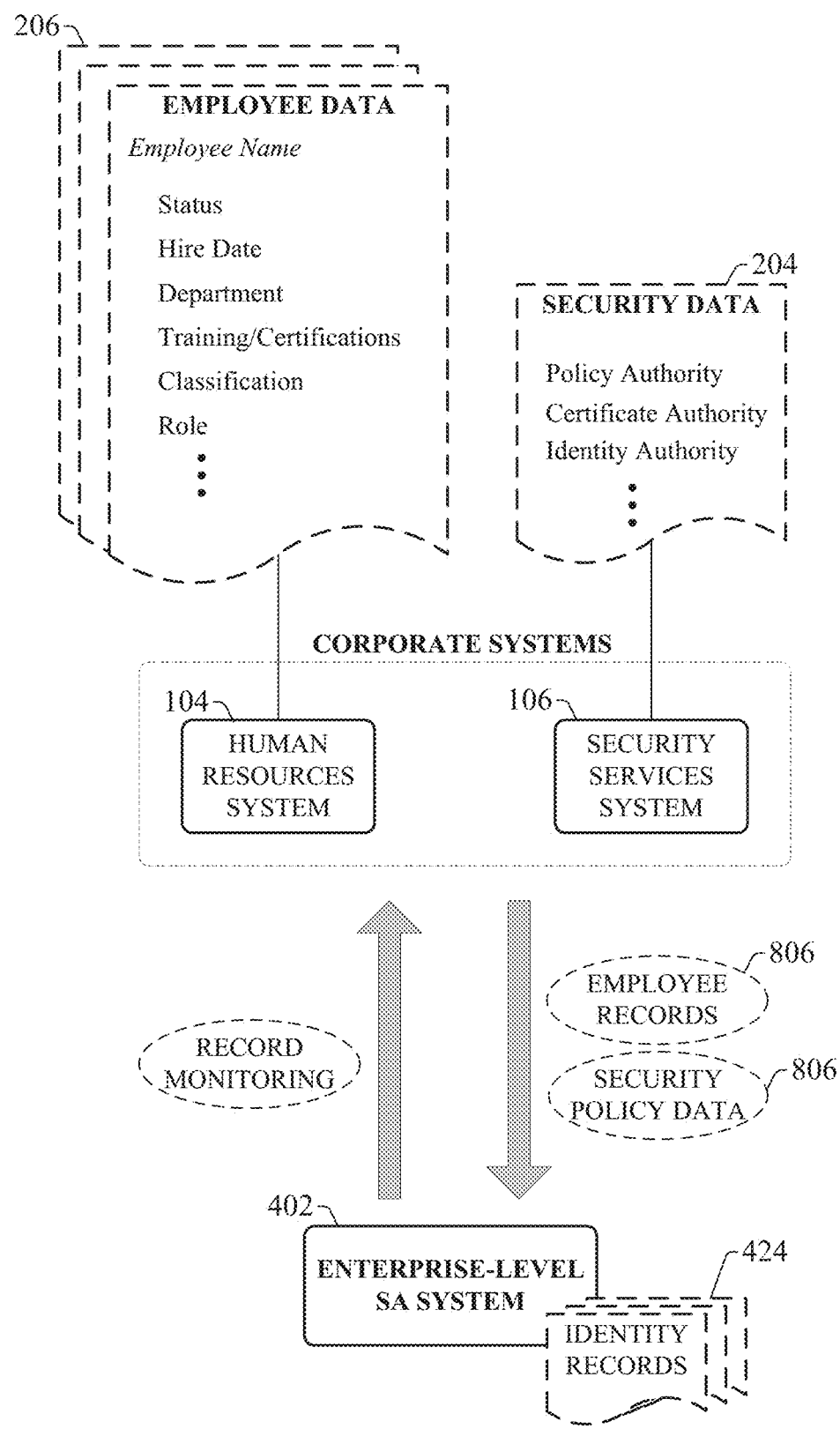
FIG. 9 is a diagram illustrating acquisition of employee and security policy data from corporate-level systems by an enterprise-level SA system.

At the corporate level—e.g., at the industrial enterprise's corporate headquarters—enterprise-level SA system 402 can access employee records 804 and/or security policy data 806 stored on human resources system 104 and security services system 106, respectively, and translate this information into identity records 424 for each employee. FIG. 9 is a diagram illustrating acquisition of employee and security policy data from corporate-level systems by the enterprise-level SA system 402. In some embodiments, the enterprise-level SA system 402 can be a certified server or another type of computing device that is installed along with the human resources and security services infrastructure at the enterprise level, allowing the system 402 to monitor and retrieve relevant data from those corporate-level systems.

As noted above, human resources system 104 can store employee data 206 that identifies individuals employed by the industrial enterprise, and includes other relevant information about each employee. This employee data 206 is typically managed by human resources personnel who are not directly associated with the manufacturing or automation side of the industrial enterprise. However, information contained in the employee data 206, as well as relevant security information included in security data 204, can be leveraged by the enterprise-level SA system 402 to identify employees who are cleared to interact with automation systems on the plant floor to varying degrees. Accordingly, enterprise-level SA system 402 can be configured to monitor the human resources system 104 and security services system 106 for updates to employee records or security policies—or addition of new records—and retrieve relevant subsets of the employee data 206 and security data 204 as needed for creation of identity records 424 to be stored in a SIL-rated security database maintained on the SA system 402.

Figure 10:
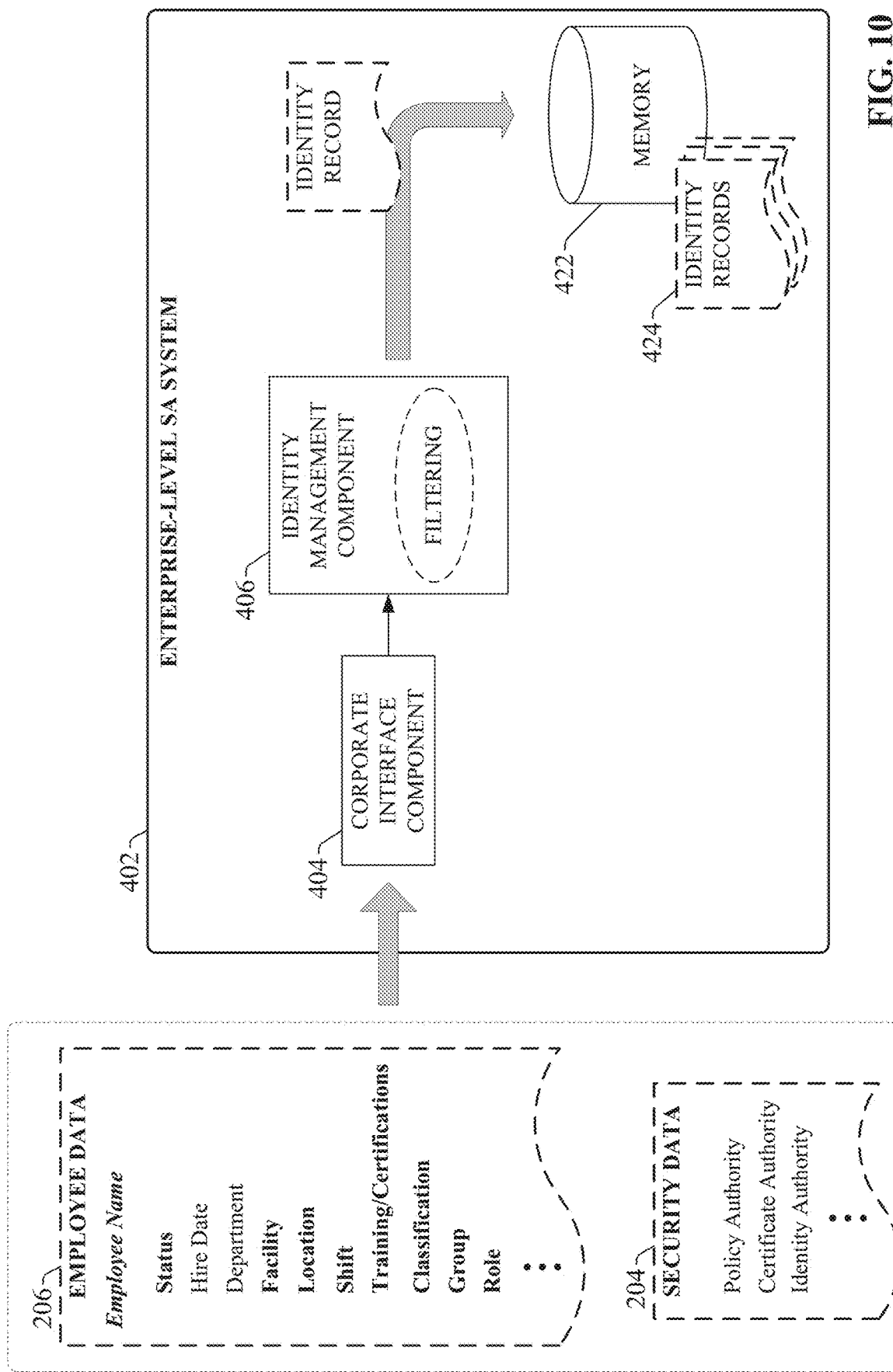
FIG. 10 is a diagram illustrating processing of employee data and security data by an enterprise-level SA system to yield identity records.

FIG. 10 is a diagram illustrating processing of employee data 206 and security data 204 by the enterprise-level SA system 402 to yield identity records 424 according to one or more embodiments. Records of employee data 206 maintained by human resources can comprise a large amount of information for each employee, some of which may not be relevant to plant-floor control and safety. Employee-specific information maintained on the human resources system 104 can include, for example, the employee's name, address, employment status (e.g., active, retired, dismissed, etc.), hire date, role (e.g., operator, engineer, maintenance, accounting, vice president, etc.), a department or facility in which the employee works, a shift to which the employee is assigned, information regarding the employee's formal training or certifications, a work group to which the employee belongs, recorded times of access and departure, or other such information. Specifics of what types of information are maintained for each employee may vary depending on the particular human resources system 104 in use by the industrial enterprise, as well as the enterprise's security requirements.

As discussed above, security services system 106 can serve as a security policy authority for the enterprise, and as such security data 204 can define corporate-level security policies to be enforced by associated building security systems. Example security policies can define, for respective buildings or building areas that make up the enterprise, which employees are permitted to access that building or area. In some enterprise architectures, security services system 106 can access employee data 206 stored on human resources system 104 in connection with defining and enforcing these security policies. Employee data 206 and security data 204 are conventionally only used for human resources and building security purposes, and are not typically leveraged within the context of industrial automation and functional safety systems.

The corporate interface component 404 of enterprise-level SA system 402 can import employee data 206 from human resources system 104. Employee data 206 from the corporate perspective can contain a large amount of information for each employee. In many cases, only a subset of this available employee information will be of interest for automation and safety purposes. Accordingly, corporate interface component 404 can be configured to retrieve, for each employee, only a subset of the data items available for each employee (e.g., the bold-faced items of employee data depicted in FIG. 10) deemed relevant to functional safety considerations on the plant floor, and to pass this pre-filtered set of employee data 206 to the identity management component 406 for processing into identity records 424. Alternatively, corporate interface component 404 can retrieve the entirety of each record of employee data 206, and identity management component 406 can filter the employee data to retain only the employee information relevant to functional safety. This reduced or filtered set of employee data can simplify subsequent safety processing. In still other embodiments, this filtering can be performed later in the process by the plant-level SA system 502. In some embodiments, filtering criteria used to select a suitable subset of the employee data can be defined by a safety administrator (e.g., via the system's user interface component 410).

If security data 204 is also available, corporate interface component 404 can retrieve all or selected subsets of this security data 204 deemed relevant to plant-floor safety. For example, a security policy may define that only employees belonging to a certain defined group or department are permitted to enter a given facility or secure area. If an automation system operates within that facility, it can be assumed that employees who are not permitted to access the facility are also to be denied access to the automation system. Accordingly, identity management component 406 can record this information as a safety restriction in the relevant identity records 424 for those employees.

Based on the employee data 206 and security data 204, identity management component generates identity records 424 for each individual employee, or for groups of employees, and stores these identity records in memory 422. FIG. 11 is an example identity record 424 that can be generated by identity management component 406 based on employee data 206 and/or security data 204 according to one or more embodiments. Each identity record 424 can be include a number of data fields and associated values. The example record 424 depicted in FIG. 11 includes fields for the employee's name, a facility in which the employee works (e.g., "Plant B"), a machine within the facility to which the user is assigned (e.g., "Machine 4"), an employment status (e.g., "active," "retired," disabled," "on vacation," etc.), a work shift during which the user is expected to be at the facility, and a classification of the employee (e.g., "Maintenance," "Operator," "Engineer," "Human Resources," "Accounting", etc.). Depending on the classification of the employee, additional classification-specific fields may also be included to further clarify the employee's role or qualifications within that classification, including but not limited to categories in which the employee has been trained (e.g., "Plant Floor," "Maintenance," "Machine Safety," etc.), a group to which the employee belongs (e.g., "Group D"), or a role or level of the employee within the classification (e.g., "Role 4")

Together, the corporate interface component 404, identity management component 406, and memory 422 serve as a SIL-rated security database for storage of identity records 424 in accordance with the industrial safety requirements dictated by IEC 61508-2 and -3, or other prevailing industrial safety standards. For example, in order to achieve a necessary SIL rating, some embodiments of enterprise-level SA system 402 can be configured to use redundant or diverse channels to read employee data 206 and security data 204 from the relevant corporate systems 104 and 106, ensuring that the identity records 424 maintained by the system 402 remain synchronized with the corporate records with a sufficiently high level of reliability. To further ensure a sufficiently high SIL rating, identity management component 406 can be configured to store duplicates of identity records 424 in two or more redundant memory locations, ensuring that loss of identity records 424 at one location does not cause the corresponding identity and security policy data to be lost. In some such embodiments, identity management component 406 can also execute record validation routines that, in the event that any corresponding redundant records do not match, determine which versions of the identity records 424 version accurately reflect the information stored on the corporate systems.

Also, in some embodiments, identity management component 406 can be configured to periodically compare (via corporate interface component 404) the identity records 424 stored on system 402 with the corresponding source data stored on the corporate systems 104 and 106, and in response to detecting a difference between an identity record 424 and its source information on the corporate side, update the identity record 424 to reflect any changes made to the employee data 206 or the security data 204. In some embodiments, detected differences between information contained in an identity record 424 and its source data can cause the identity management component 406 to log the detected difference in an audit log, and, in some embodiments, to issue a notification of the difference to an authorized administrator.

SA system 402 can also employ strong error detection techniques (e.g., strong checksum routines) so that errors in stored identity records 424 are reliably detected and corrected. Also, some embodiments of identity management component can be configured to apply a unique SIL-rated digital signature to each identity record 424 verifying the authenticity of the information contained in the record 424. This can prevent counterfeit identity information from being introduced into the system 402 and used to subvert identity-based safety protocols on the plant floor. In such embodiments, the corresponding plant-level SA system 502 (to be described in more detail below) can be configured to enroll an identity record 424 on the control-level side only if the record 424 includes an authentic digital signature.

Also, to further ensure a sufficient level of safety integrity, some embodiments of enterprise-level SA system 402 can be configured to require review and approval of each new identity record 424 by an authorized safety administrator before allowing the identity record 424 to be registration in memory 422. Before allowing registration in this scenario, these embodiments of system 402 can be configured to first verify that the administrator approving the new record 424 is not the same person who created or modified the original record in the corporate systems 104 and 106, thereby enforcing a two-tiered approval and review process for creation and registration of identity records 424.

Returning to the system overview of FIG. 8, enterprise-level SA system 402 acts as a SIL-rated source of validated identity and policy data originating on the corporate level (the standard domain), and can therefore serve as a SIL-compliant gateway to the control level (the safety domain) for delivering this information to the plant floor. To complete the link between the standard domain and the safety domain, enterprise-level SA system 402 communicatively connects to a plant-level SA system 502 that resides on the plant floor of the industrial facility in which the industrial automation systems operate.

Figure 12:
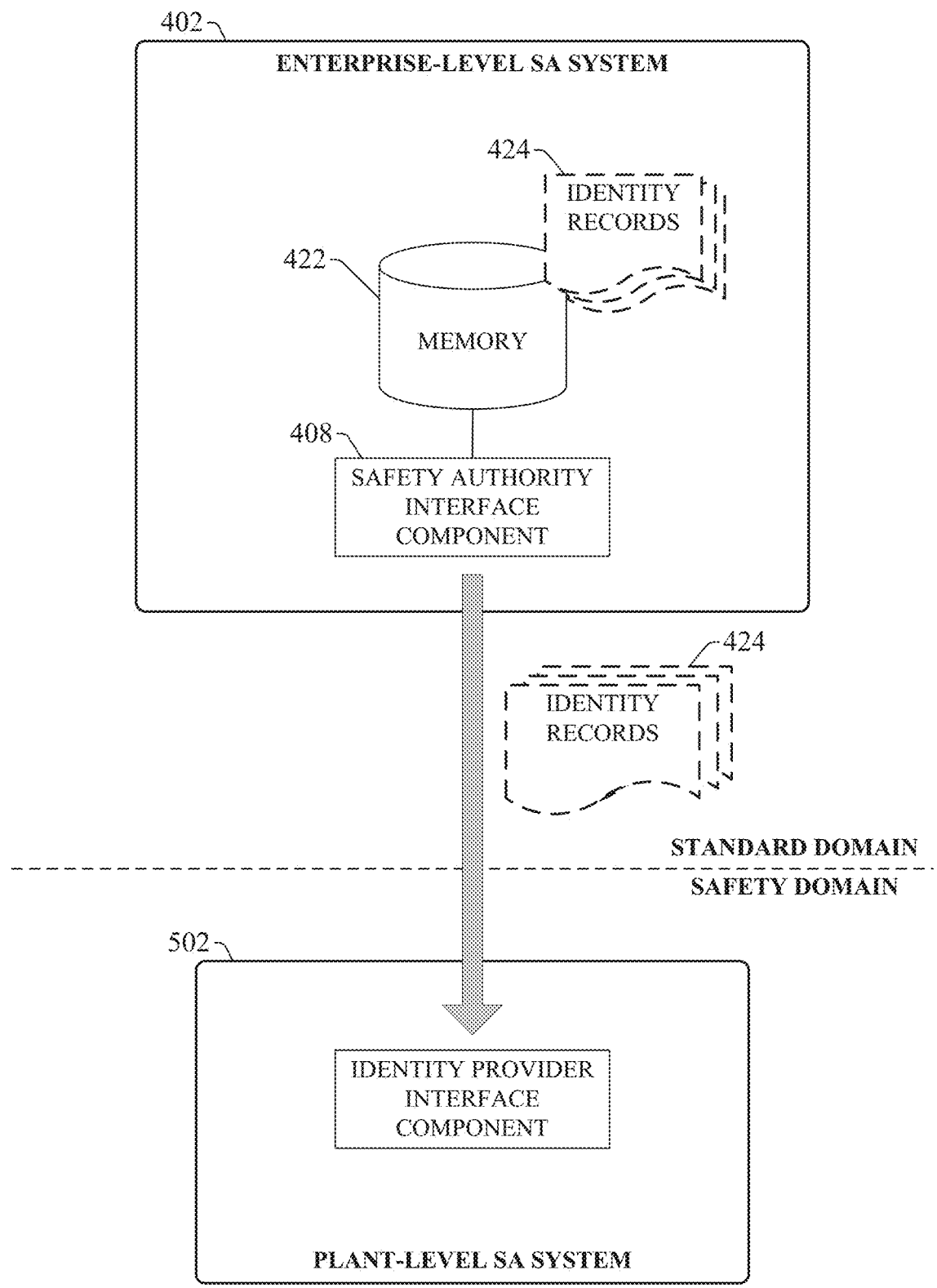
FIG. 12 is a diagram illustrating delivery of identity records from the enterprise-level SA system to the plant-level SA system.

FIG. 12 is a diagram illustrating delivery of identity records 424 from the enterprise-level SA system 402 to the plant-level SA system 502. Plant-level SA system 502 acts as a local safety authority within the plant facility for identity- or security-based safety, based on identity and/or security information contained in the identity records 424. To this end, the safety authority interface component 408 of the enterprise-level SA system 402 communicates with the identity provider interface component 504 of the plant-level SA system 502 over a SIL-rated communications link (e.g., using black channel principles). When new identity records 424 are added to the enterprise-level SA system 402, or when an identity record 424 is updated, enterprise-level SA system 402 sends (via safety authority interface component 408) the updated identity records 424 to the plant-level SA system 502 for local storage and processing. In this way, changes or additions to employee information made on the enterprise or corporate level are enrolled in the plant-level SA system 502, so that this information can be used in connection with functional safety decisions on the plant floor.

In some embodiments, plant-level SA system 502 can be embodied as a specialized SIL-rated unit of industrial hardware mounted within a control cabinet on the plant floor. Alternatively, the plant-level SA system 502 can be implemented as a safety authority application that runs on IT hardware within the plant facility. In either type of implementation, the SA systems 402 and 502 can communicate via any intervening networks between the two systems, which may include plant network 16, office network 108, and/or a public network such as the internet or a cloud platform.

As described above, identity records 424 comprise employee and security information obtained from corporate-level systems deemed relevant to functional safety considerations on the control level (the safety domain), including employee identities, their roles, training, enterprise-level security privileges (e.g., building or area access privileges), etc. Plant-level SA system 502 can be configured to process these identity records 424, alone or in conjunction with control-level safety policy data 524 defined on the system 502, to yield user credential records that serve as the basis for security tokens used to enforce user- or role-specific safety.

Figure 13:
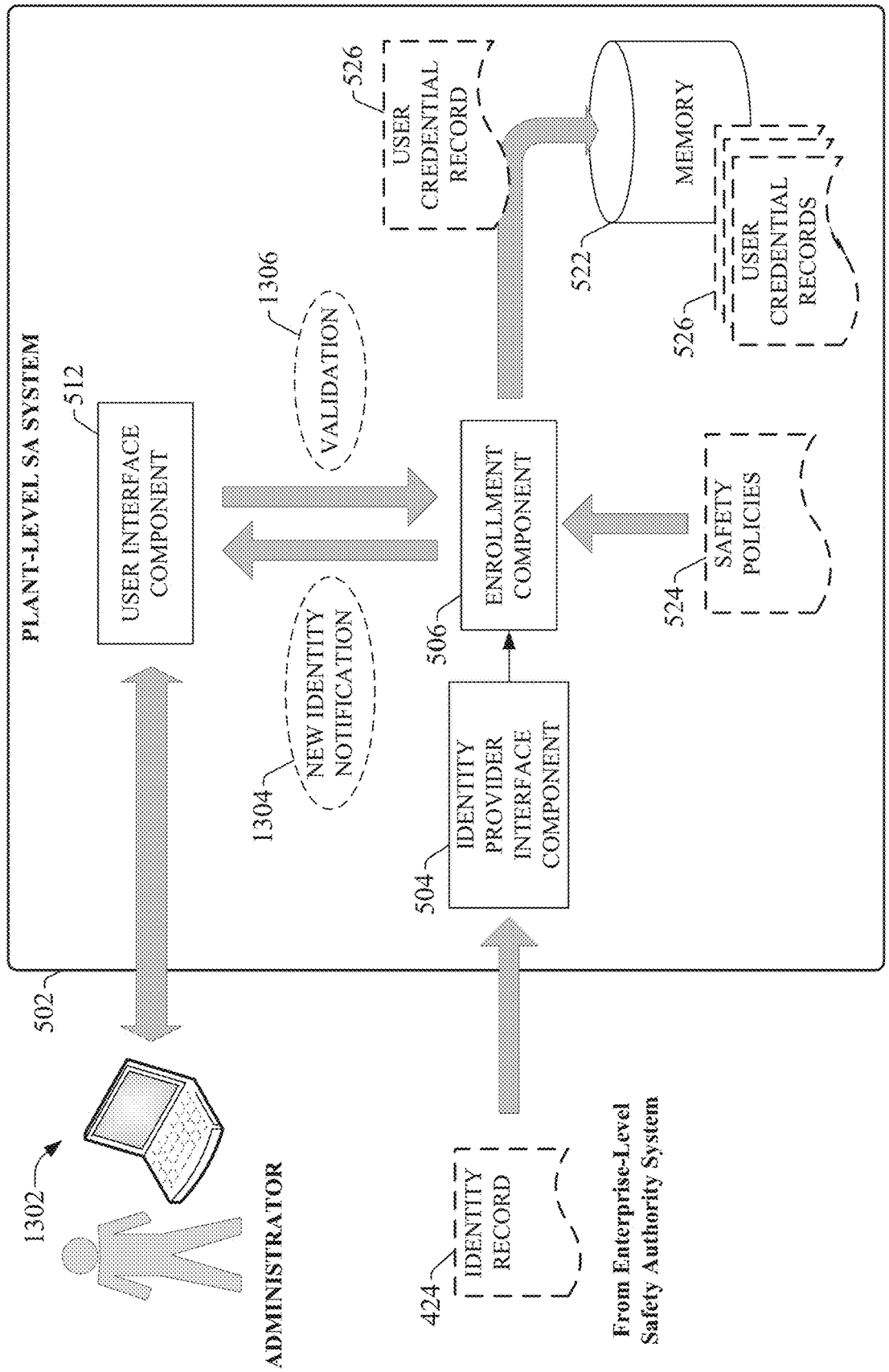
FIG. 13 is a diagram illustrating processing performed by a plant-level SA system on identity records.

FIG. 13 is a diagram illustrating processing performed by the plant-level SA system 502 on identity records 424 according to one or more embodiments. In order to ensure authenticity of the identity records 424 and accuracy of the employee and/or security policy data contained in those records, some embodiments of plant-level SA system 502 can require all identity records 424 to be reviewed by a human administrator before enrolling the information in the system 502. Accordingly, when an identity record 424 (or an update thereto) is received from the enterprise-level SA system 402, an enrollment component 506 of the plant-level SA system 502 issues a new identity notification 1304 directed to the administrator (e.g., a plant safety administrator). This notification 1304 can be delivered to a client device 1302 associated with the administrator via the system's user interface component 512. Notification 1304 conveys to the administrator that a new identity record 424 has been received and requires review. In some embodiments in which enterprise-level SA system 402 employs digital certificates to authenticate identity records 424 (as described above), enrollment component 506 may be configured to reject any identity records 424 that do not include a verifiable digital certificate, and to notify the administrator that an invalid identity record 424 has been received.

When a valid identity record 424 has been received and notification 1304 has been issued, the administrator can interface with the system 502 via user interface component 512 to view the information contained in the identity record 424. Typically, the administrator who reviews identity records 424 on the plant-level SA system 502 will be a plant-level administrator as opposed to a corporate-level administrator. Since the authenticity and accuracy of the employee identities and their associated roles, training, and security privileges can be assumed to be accurate (due to the SIL-rated verifications carried out by the enterprise-level SA system 402), the administrator may review the identity records 424 primarily from the point of view of plant-level safety and security. For example, although an identity record 424 corresponding to a given employee may indicate that the employee's role and certifications qualify the employee to initiate a particular control action on an automation system that operates within the plant, the plant-level safety administrator may choose to nevertheless deny the employee the ability to perform this control action due to mitigating circumstances known to the plant-level administrator (e.g., a desire to temporarily limit initiation of the control action to a selected few employees regardless of qualifications, recent actions by the employee that disqualify the employee from interacting with the automation system, etc.). Alternatively, the administrator may choose to approve enrollment of the identity record 424, thereby granting the corresponding employee the scope of safety-level access defined by the identity record 424. In this way, enterprise-level employee and security policy data is always verified with a human safety authority on the plant-floor level, providing safe assurances on all data enrolled in the plant-level SA system 502.

For embodiments in which the employee data contained in the identity record 424 has not been filtered by the enterprise-level SA system 402 as described above, enrollment component 506 can be configured to perform this filtering prior to sending the identity notification 1304 and performing subsequent processing on the record 424.

Upon receipt of a validation notification 1306 from the administrator, enrollment component 506 generates a user credential record 526 for the employee based on the identity record 424 and any plant-level safety policy data 524 defined on the plant-level SA system 502. User credential record 526 can define, for its associated employee, a scope of safety-level access or interactions permitted to the employee relative to one or more automation systems, machines, or areas of the plant. These access or interaction permissions can be defined based solely on the employee and security policy information included in the identity records 424, or may be defined based on a correlation of the identity records 424 with plant-level safety policy data 524 (as described in more detail below).

In general, automation and safety systems on the plant floor (the safety domain) view the plant-level SA system 502 as the sole safety authority for identity- and role-based safety. To this end, each user credential record 526 can comprise information that allows industrial automation and safety systems to determine whether the corresponding employee is permitted to access a particular protected area relative to a hazardous controlled machine, or to perform a requested control or maintenance action relative to the machine. Example safety functions that can be regulated by plant-level SA system 502 based on identity or role can include, but are not limited to, starting or stopping of a machine or manufacturing process, changing of control variables or setpoints for the machine or process, changing of safety variables on an industrial safety system (e.g., safe limited speed, safe limited torque, safe positioning, safe acceleration), accessing a protected or guarded zone near a machine while the machine is stopped, accessing the protected zone while the machine is running, resetting of safety functions after a safety trip, or other such functions. Plant-level SA system 502 regulates a user's ability to perform these safety functions based on the user's role or identity.

The following tables illustrate example safety function permissions as a function of employee role. With regard to the example security functions mentioned above, employees identified as operators may be permitted to start and stop a machine, change a control setpoint for the machine, access a guarded zone while the machine is stopped, and reset safety functions. However, operators are prohibited from changing safety variables or accessing the guarded zone while the machine is running. These operator permissions are summarized in Table 1 below.

TABLE 1

| Operator Role | |
| --- | --- |
| Security Function | Permitted |
| Start/Stop Machine | YES |
| Change Control Variables | YES |
| Change Safety Variables | NO |
| Access Machine Guarded Zone While Stopped | YES |
| Access Machine Guarded Zone While Running | NO |
| Reset Safety Functions | YES |

Employees identified as having a maintenance technician role or a controls engineer role may be permitted to perform all of the above functions with the exception of changing safety variables, as outlined in Table 2 below.

TABLE 2

| Maintenance Technician or Controls Engineer Role | |
| --- | --- |
| Security Function | Permitted |
| Start/Stop Machine | YES |
| Change Control Variables | YES |
| Change Safety Variables | NO |
| Access Machine Guarded Zone While Stopped | YES |
| Access Machine Guarded Zone While Running | YES |
| Reset Safety Functions | YES |

Employees identified as having a functional safety supervisor role may be permitted to change safety variables for a safety system associated with a hazardous machine, reset safety functions for the machine, and access the guarded zone while the machine is stopped. However, the safety supervisor may be prohibited from performing functions related to actual machine operation, such as starting and stopping the machine, changing control variables, or accessing the guarded area while the machine is running. These permissives are summarized in Table 3 below.

TABLE 3

| Functional Safety Supervisor Role | |
| --- | --- |
| Security Function | Permitted |
| Start/Stop Machine | NO |
| Change Control Variables | NO |
| Change Safety Variables | YES |
| Access Machine Guarded Zone While Stopped | YES |
| Access Machine Guarded Zone While Running | NO |
| Reset Safety Functions | YES |

Employees classified as office staff—e.g., members of the financial department, secretaries, sales staff, etc. —may be denied all interactions with the automation system. Similarly, visitors to the plant who are not employees of the industrial enterprise are also prohibited from all machine interactions. These permissives are summarized in Table 4 below.

TABLE 4

| Office Staff or Visitor Role | |
| --- | --- |
| Security Function | Permitted |
| Start/Stop Machine | NO |
| Change Control Variables | NO |
| Change Safety Variables | NO |
| Access Machine Guarded Zone While Stopped | NO |
| Access Machine Guarded Zone While Running | NO |
| Reset Safety Functions | NO |

Employees having a role classified as Facilities Staff—who may work within the plant facility but are not qualified to operate the automation or safety systems (e.g., janitorial staff)—may be permitted only to access the guarded zone while the machine is stopped, but are prohibited from otherwise interacting with the machine, as summarized in Table 5 below.

TABLE 5

| Facilities Staff Role | |
| --- | --- |
| Security Function | Permitted |
| Start/Stop Machine | NO |
| Change Control Variables | NO |
| Change Safety Variables | NO |
| Access Machine Guarded Zone While Stopped | YES |
| Access Machine Guarded Zone While Running | NO |
| Reset Safety Functions | NO |

Although the foregoing examples discuss specific security functions and user roles, it is to be appreciated that embodiments of the plant-level SA system 502 are not limited to these examples. In general, any type of user role having associated safety privileges can be defined, and can be applied to substantially any type of safety function applicable to a particular industrial environment.

As noted above, enrollment component 506 can generate a user credential record 526 for an employee based on the validated identity record 424 for that employee, either alone or in conjunction with defined plant-level safety policy data 524 defined on the plant-level SA system 502. Enrollment component 506 can derive an employee's safety permissions based in part on the employee's enterprise-level security privileges, certifications and training, role (e.g., operator, office staff, maintenance, etc.), facility, assigned machine, or other information contained in identity record 424. In other examples, based on an employee's assignment to a particular plant facility designated in the employee's identity record 424, enrollment component 506 may set the user credential record 526 for that employee to prevent the employee from interacting with machines in other facilities, while selectively permitting interactions with machines within the employee's designated facility in accordance with the employee's role or identity. If the employee's identity record 424 specifies a particular machine or production area to which the employee is assigned, the employee's user credential record 526 can specify that the employee is not permitted to interact with machines outside the employee's assigned area, but is selectively permitted to interact with machines within the assigned area as deemed appropriate to the employee's role.

In another example, the work shift to which the employee is assigned can also be used to define time-based safety permissives on the employee's interactions. For example, if the employee's identity record 424 indicates that the employee is assigned to the first work shift, the employee's user credential record can specify that the employee is permitted to perform role-appropriate interactions with one or more machines in the employee's designated work area during this shift, but is to be prevented from performing these interactions during other shifts. In still other examples, the degree of interaction granted to the employee can be determined further based on the user's training or certifications, as defined in the identity record 424.

In some scenarios, the degree of safety access associated with different roles, certifications, or other categorizations can be defined by plant-level safety policy data 524 stored on the plant-level SA system 502. For example, plant-level safety policy data 524 can define, from the control-level perspective, the types of access to be permitted for each type of user role (operator, maintenance, plant manager, office staff, etc.), or to be associated with each classification, certification, training level, etc. Plant-level safety policies defined by safety policy data 524 differ from enterprise-level security policies in that the scope of safety policies are specific to the plant floor environment in which the plant-level SA system 502 operates, and as such may depend on the particular industrial applications being carried out within the plant facility, or the particular types of machines operating within the plant. Accordingly, safety policy data 524 may define plant-specific and machine-specific actions that are permitted to each type of user role, with reference to specific systems, control actions, protected zones, or areas within the plant.

Safety policy data 524 can also define customized safety privileges for scenarios in which the safety administrator wishes to override default safety access privileges that would otherwise be set based on the enterprise-level identity and security policy information. This can also allow an administrator to record individual capabilities (e.g., training or certifications) associated with a selected user that expand the user's safety function permissives beyond those of other users having a similar role.

Since information about what actions a given user role is allowed to perform relative to an automation system is often specific to the industrial application carried out by the automation system, safety policy data 524 can be leveraged in cases in which specific permitted interactions cannot be inherently derived from the enterprise-level identity and security policy information contained in the identity records 424 alone. In an example scenario, an identity record 424 may comprise an employee's identity, role, security privileges and other enterprise-level information for the employee. Upon receipt of this identity record 424, enrollment component 506 can access safety policy data 524 to determine the scope of safety privileges associated with the role specified in the identity record 424 (or with the specific user if the safety policy data 524 defines custom safety privileges the employee), and generate a user credential record 526 for the employee defining these privileges.

As with validation of identity records, definition of plant-level safety policies can be limited to one or more plant-level administrators with appropriate administrator credentials that are verifiable by the SA system 502.

The architecture achieved by integrating SA systems 402 and 502 into the industrial enterprise creates a SIL-compliant bridge between the corporate level and the plant-floor level, and allows existing user credentials stored on corporate-level HR systems to be transformed into the safety domain and passed to the control level, where these user credentials are used by the plant-level SA system 502 to implement role-based or identity-based industrial safety. The user credential records 526 are stored on the plant-level SA system 502 with proofs of integrity, yielding a SIL-rated identity-based safety system.

Figure 14:
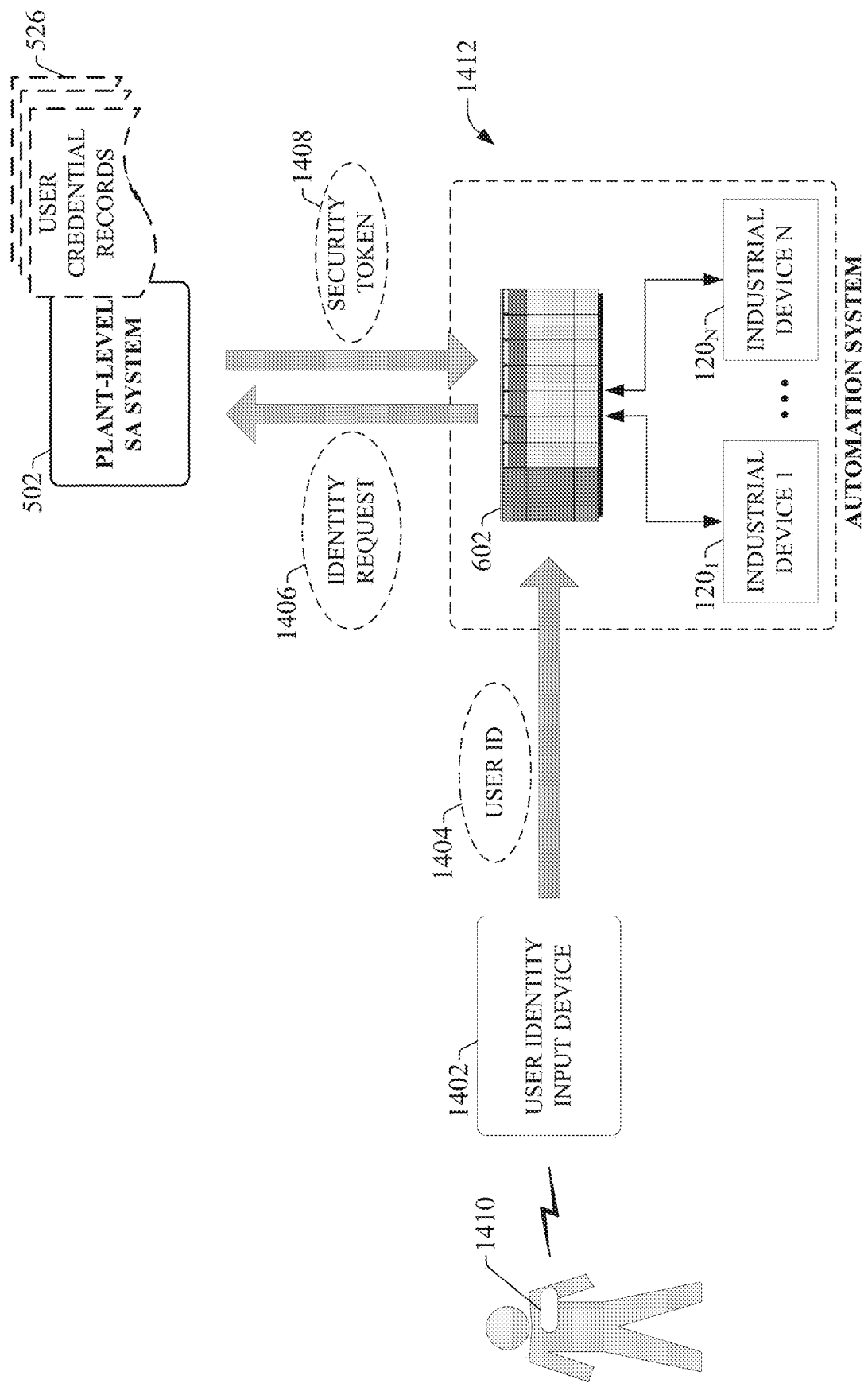
FIG. 14 is a diagram illustrating an example procedure for identifying a user attempting to interact with an industrial automation system and provisioning of a security token by a plant-level SA system based on the user's credentials.

FIG. 14 is a diagram illustrating an example procedure for identifying a user attempting to interact with an industrial automation system and provisioning of a security token 1408 by plant-level SA system 502 based on the user's credentials. In an example architecture, an industrial automation system 1412 and its associated safety system (comprising one or more industrial controllers 602 that support identity-based safety, associated industrial input and output devices 120, and machinery controlled by these industrial assets) is interfaced with a user identity input device 1402 configured to obtain user identity information from a user and provide this identity information to the automation system (e.g., to industrial controller 602). Any suitable type of technology can be used to identify individuals attempting to interact with the automation system. For example, user identity input device 1402 may be a badge reader configured to wirelessly read user electronic identification data stored on a badge 1410 worn or carried by the user (e.g., a radio frequency identification, or RFID, badge). As an alternative to a badge, another type of portable device, such as a universal serial bus (USB) device or portable phone carrying the user's unique identification information, can be used. Other technologies that can be used by device 1402 can include, but are not limited to, fingerprint reading, iris scanning, facial recognition, or other biometric recognition technologies. User identity input device 1402 may also employ simpler identification technique such as user name and password entry. Some embodiments of user identity input device 1402 can be configured to collect and combine multiple types of identity information from the user (e.g., a badge reader combined with facial recognition) to add an additional layer of security to, or improve the safety integrity of, the user identification process. Since user identification is being used in context of industrial safety, user identity input device 1402 can be configured to capture the user's identity with safety integrity, such that the device 1402 can detect, process, store, and transport the identity information via a safety-rated protocol.

Although FIG. 14 depicts a separate user identity input device 1402 being used to collect user identification information, in some embodiments the industrial controller 602, or another industrial device, can include interfacing technology configured to reliably obtain the user's identification data.

Once the user's identification information has been obtained, user identity input device 1402 passes the user identification data 1404 to the industrial controller 602. The controller's user identification component 606 (not shown in FIG. 14) can process this user identification information to generate an identity request 1406 that includes the user's identification, and send this identity request 1406 (via the controller's safety authority interface component 604) to the plant-level SA system 502 for identity validation using a safety-rated communication protocol. In some embodiments, the controller 602 can be configured to execute identity query instructions that, in response to receipt of user identification data 1404, generates and sends the identity request 1406 in a manner similar to a messaging instruction. The controller's safety authority interface component 604 can also be configured to digitally sign the request 1406, or apply another type of verifiable authenticity credential, so that the plant-level SA system 502 can verify that the request 1406 was generated by an approved control device on the plant floor.

Figure 15:
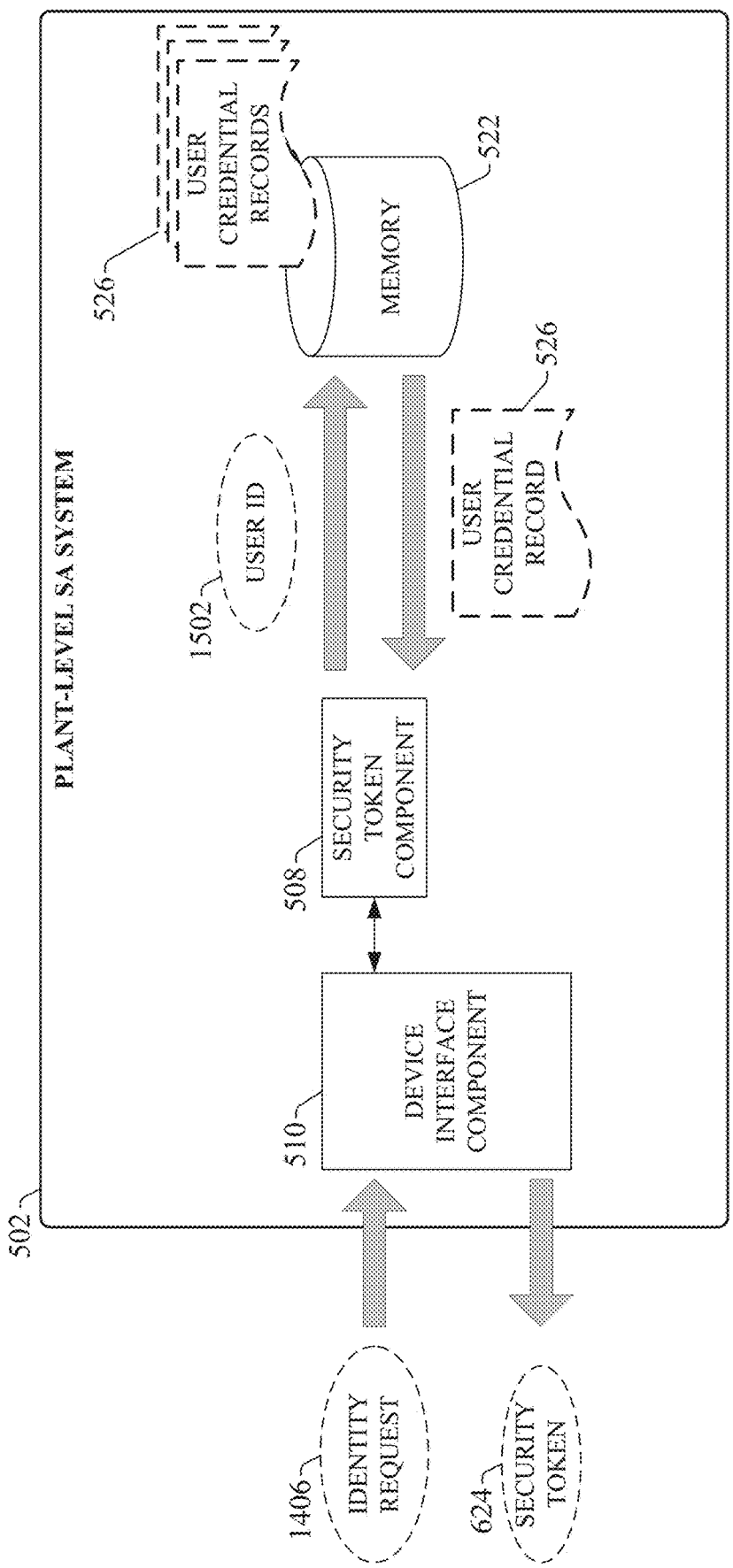
FIG. 15 is a diagram illustrating processing of an identity request by a plant-level SA system.

FIG. 15 is a diagram illustrating processing of the identity request 1406 by the plant-level SA system 502. In general, plant-level SA system 502 determines safety functions that the user is permitted to perform based on the user's identity, and returns a security token 624 to the industrial controller 602 that enforces these safety permissives. When an identity request 1406 is received via the system's device interface component 510, the security token component 508 verifies the authenticity of the request 1406 (e.g., based on a digital signature or another type of credential applied by the controller 602) and cross-references the user identity 1502 specified in the identity request 1406 with the user credential records 526 to identify the record 526 corresponding to the user identity 1502. As noted above, the user credential record 526 comprises identity and security policy data for the user that has been imported from the corporate-level systems, including the user's role (e.g., operator, plant manager, maintenance, office staff, etc.); designated facility, production area, and/or machine; expected work shift; training and certifications; or other such information that can be used to determine which safety functions the user is permitted to perform (or prohibited from performing). User credential record 526 may also define specific safety functions that the user is permitted to perform based on the user's role or other qualifications. Alternatively, security token component 508 can determine one or more safety functions that the user is permitted to perform based on a cross-referencing of the identity, role, and training information defined in the user credential record 526 with the safety policy data 524 defined on the plant-level SA system 502, which can define specific permissible security functions associated with the user's role, training, etc. Based on this information, security token component 508 can specify these permitted safety functions in the security token 624.

Based on the user credential record 526 associated with the user (and, in some embodiments, safety policy data 524), security token component 508 generates a security token 624 that, when executed on the industrial controller 602, enforces the identity- or role-based safety policies associated with the user. Device interface component 510 then sends the security token 624 to the controller 602 via the safety-rated communication channel.

Figure 16:
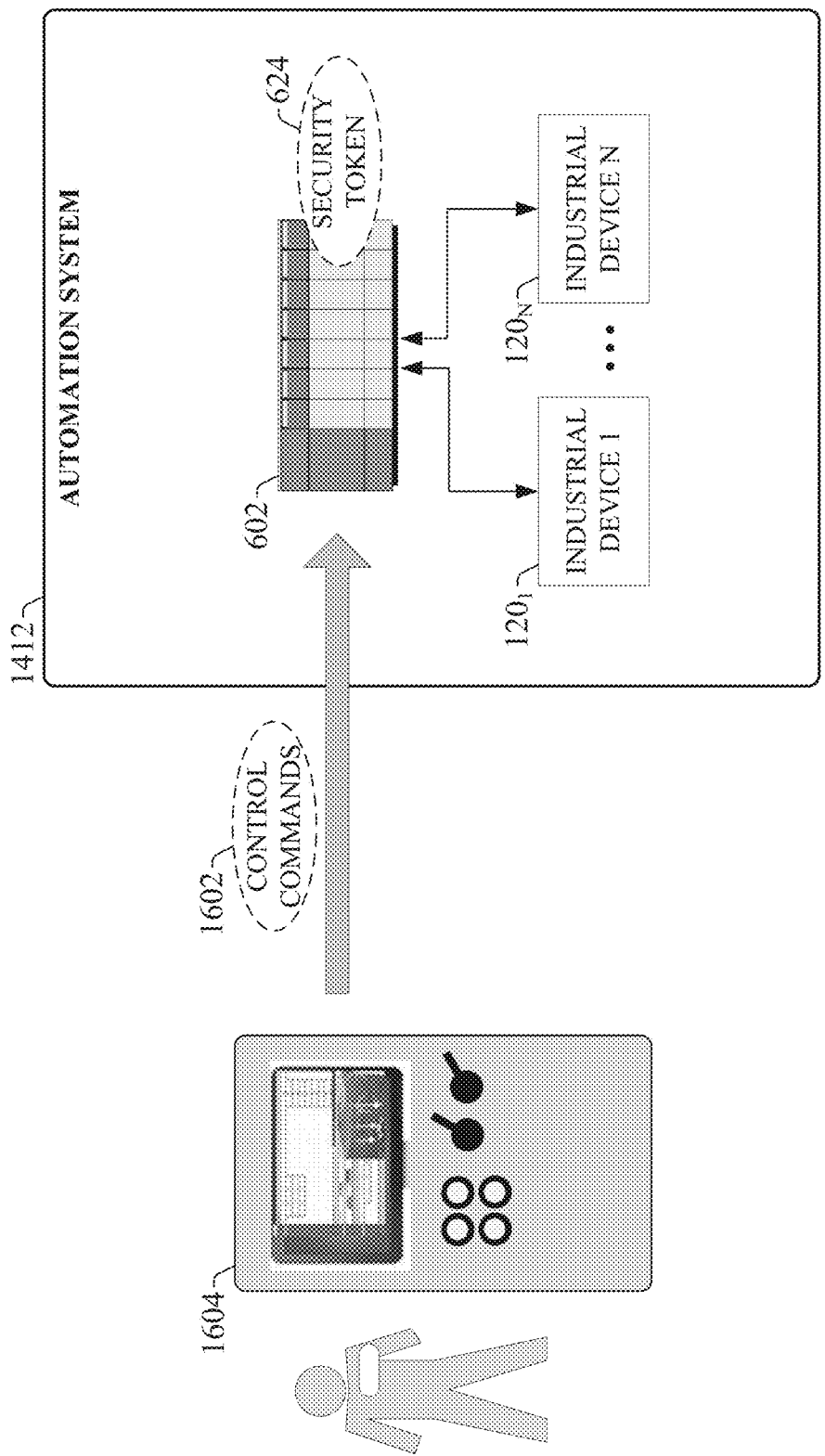
FIG. 16 is a diagram illustrating enforcement of identity-based or role-based safety in accordance with a user-specific safety token.

FIG. 16 is a diagram illustrating enforcement of identity-based or role-based safety in accordance with a user-specific safety token 624. In this example, the user interacts with automation system 1412 via a control cabinet 1604 in which is installed various user interface devices or systems, including but not limited to push buttons, position switches, indicator lights, a human-machine interface terminal, telemetric display devices, or other such interface devices and systems. In some configurations, at least some of the control devices that make up the automation system 1412, such as industrial controller 602, may be mounted inside the control cabinet 1604, while other industrial assets that make up the automation system 1412—e.g., the controlled industrial machines, I/O devices, telemetry devices, safety devices, etc. —reside outside the cabinet 1604. Through interaction with the user interface devices and systems installed on the control cabinet 1604, the user can submit control commands 1602 to the automation system. Example control commands 1602 can include, but are not limited to, machine start and stop commands, machine home commands, commands to clear faults, control setpoint modifications (e.g., changes to speeds, temperatures, flow rates, etc.), adjustments to safety parameters, commands to move a pneumatic or hydraulic actuator (e.g., a gripper, a pusher, etc.), commands to set an operating mode of the automation system 1412 (e.g., run mode, semi-automatic mode, a part change-over command, etc.) or other such commands.

Figure 17:
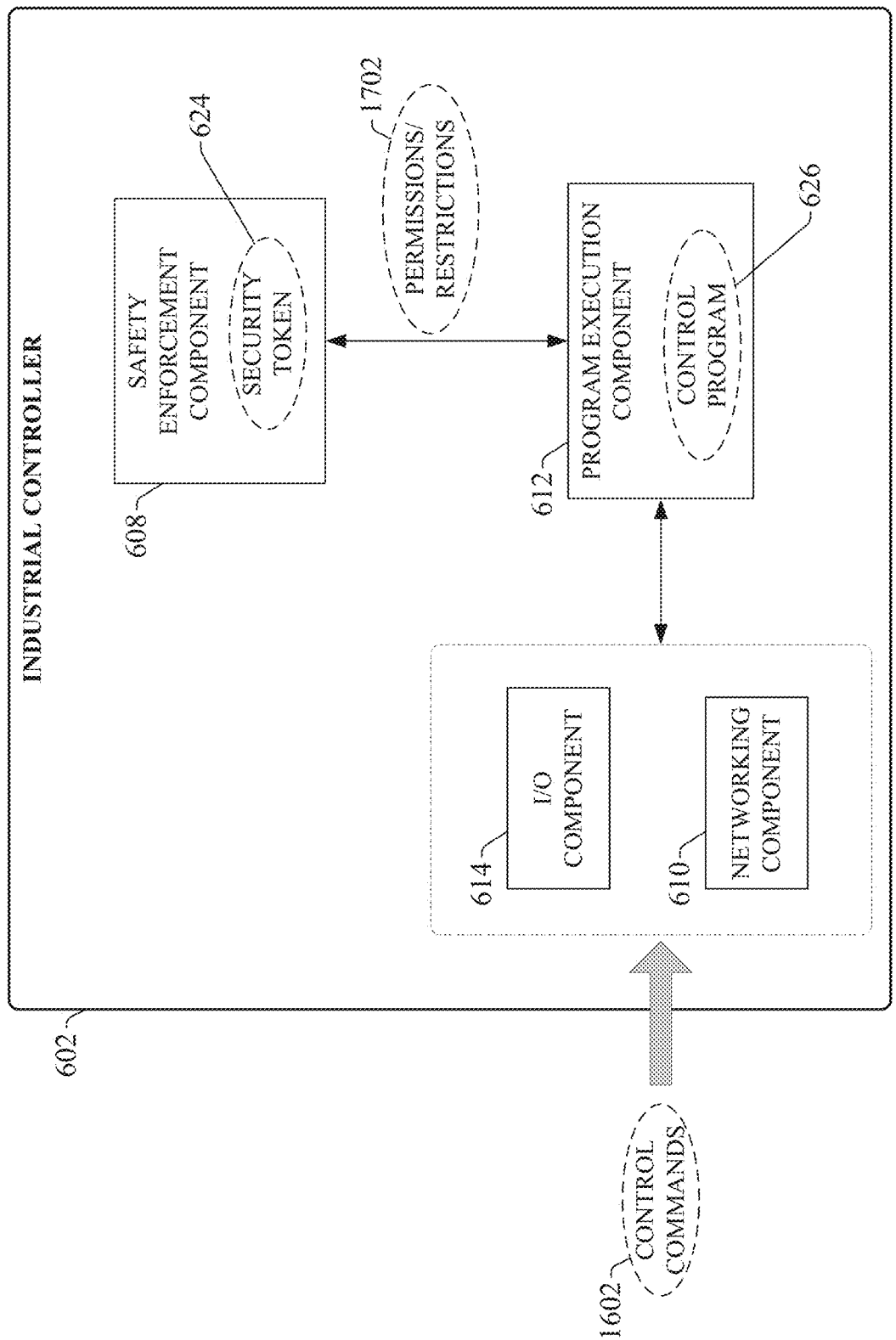
FIG. 17 is a diagram illustrating enforcement of role-based security by an industrial controller based on a security token received from a plant-level SA authority.

FIG. 17 is a diagram illustrating enforcement of role-based security by the industrial controller 602 based on the security token 624 received from the plant-level SA authority 502. The industrial controller's program execution component 612 executes an industrial control program 626 (e.g., a ladder logic program, a function block diagram program, structured text, a sequential function chart program, etc.) that causes the industrial controller 602 to monitor and control an industrial machine or process in accordance with control routines defined by the program 626, as discussed above in connection with FIG. 1. Control commands 1602 issued by a user—e.g., via interaction with devices or systems mounted in control panel 1604—can be received via the controller's I/O component 614 (e.g., as a hardwired signal received from user input devices such as push buttons, switches, pull cords, etc.) or via the controller's networking component 610 (e.g., as a data packet received from an HMI networked to the controller 602).

The control command 1602 can act as an instruction to initiate a control action relative to the automation system, such as starting or stopping a machine or process, placing the machine in a selected operating mode, modifying a control setpoint or parameter (e.g., an operating speed, a process temperature, a flow rate, etc.), modifying a safety parameter, or other such commands. As described above, the plant-level SA system 502 can regulate the ability of the user to initiate these control actions, or perform other interactions relative to the automation system, as a function of the user's identity, role, certifications, etc. In the illustrated embodiment, the controller's safety enforcement component 608, when executing the user-specific security token 624 issued to the controller 602, serves as a local safety authority while the user is interacting with the system. Security token 624 defines safety function permissions and restrictions 1702 associated with the identified user, and the safety enforcement component 608 interacts with the program execution component 612 to enforce these permissions and restrictions.

For example, when the controller 602 receives a control command 1602 attempting to modify a control setpoint, program execution component 612 only implements the setpoint modification if approved by the safety enforcement component 608, as dictated by the user-specific security token 624. Alternatively, if the security token 624 indicates that control setpoint modifications are not within the safety scope of the user currently interacting with the automation system, safety enforcement component 608 instructs the program execution component 612 to reject the request to alter the setpoint. In some embodiments, safety enforcement component 608 (or the plant-level SA system 502) can also generate and deliver a notification of the improper modification attempt to one or more administrators or log a record of the attempt.

In this manner, safety enforcement component 608 can instruct program execution component 612 to either implement or reject received control commands 1602 in accordance with the safety permissives defined by the security token 624. Although the illustrated example considers a scenario in which control commands 1602 are received via interaction with control panel devices, it is to be appreciated that other types of user interactions can also regulated by safety enforcement component 608. For example, the ability to modify the control program 626 itself, which may be done using a client device connected to the controller 602 via a programming port or the networking component 610, can be limited to users having engineering roles, and this restriction can be enforced by safety enforcement component 608 in a similar manner.

In another example, the safety enforcement component 608 can be a component of a safety relay or safety controller that monitors safety input devices—e.g., emergency stop pushbuttons, pull cords, safety mats, light curtains, optical safety scanners, etc. —that make up a safety system associated with the automation system. The safety system can monitor for human presence within protected areas near hazardous machines controlled by the automation system, and initiate safety countermeasures that place the machines in a safe state in response to detecting human presence in these areas (e.g., by disconnecting power from the hazardous equipment, by placing the equipment in a slow or stopped operating mode, etc.). As indicated in Tables 1-5 above, some safety policies may define that users of certain selected roles—e.g., maintenance personnel—are permitted to enter a protected area while the hazardous equipment is running. Accordingly, the role-specific security token 624 for a user currently interacting with the system can specify whether the user is permitted to access the protected area without causing a safety countermeasure to be initiated. If the security token 624 indicates that the user is permitted to enter the protected area without causing a safety countermeasure to be initiated, the safety enforcement component 608 can prevent the safety controller from placing the hazardous equipment in the safe state in response to detecting the user within the area.

The lifespan of security token 624 can be controlled in different ways according to various embodiments. For example, in some embodiments the current security token 624 can remain active on industrial controller 602 until subsequent user identification data 1404 is received at the controller 602, indicating that a different user is now interacting with the system. When subsequent user identification data is received 1404, the controller 602 deletes or disables the current security token 1408 and requests a new security token 1408 from the plant-level SA system 502 in accordance with the new user identity. In another example, safety enforcement component 608 can delete or disable the current security token 1408 in response to detecting that the present user is no longer interacting with the automation system. This can be determined, for example, based a determination that the user has moved outside a defined proximity range of the system, based on photo-eye or optical scanner output indicating that the user has exited the production area, based on detection of a safety gate opening or closing, or by another detection means. In another example, the security token 624 can be granted a limited lifespan after deployment, such that the security token 624 is deleted or disabled after a defined time period has elapsed. When no identity-specific security token 624 is active (e.g., when the security token 624 has been deleted or disabled), the safety enforcement component 608 can regulate operation of the automation system in accordance with a default level of safety deemed appropriate for all types of users.

As an alternative to issuing user-specific safety tokens 624 to the industrial devices, in some embodiments the industrial controller 602 can be configured to refer to the plant-level SA system 502 in response to receipt of a control command 1602 in order to determine whether the user currently interacting with the system is permitted to perform the requested control action. In such embodiments, the controller 602 can send the request to the plant-level SA system 502 together with the user identification data 1404. In response, plant-level SA system 502 can determine whether the user is permitted to perform the requested action based on the user credential records, and return a response to the controller 602 to permit or deny the requested action.

Figure 18:
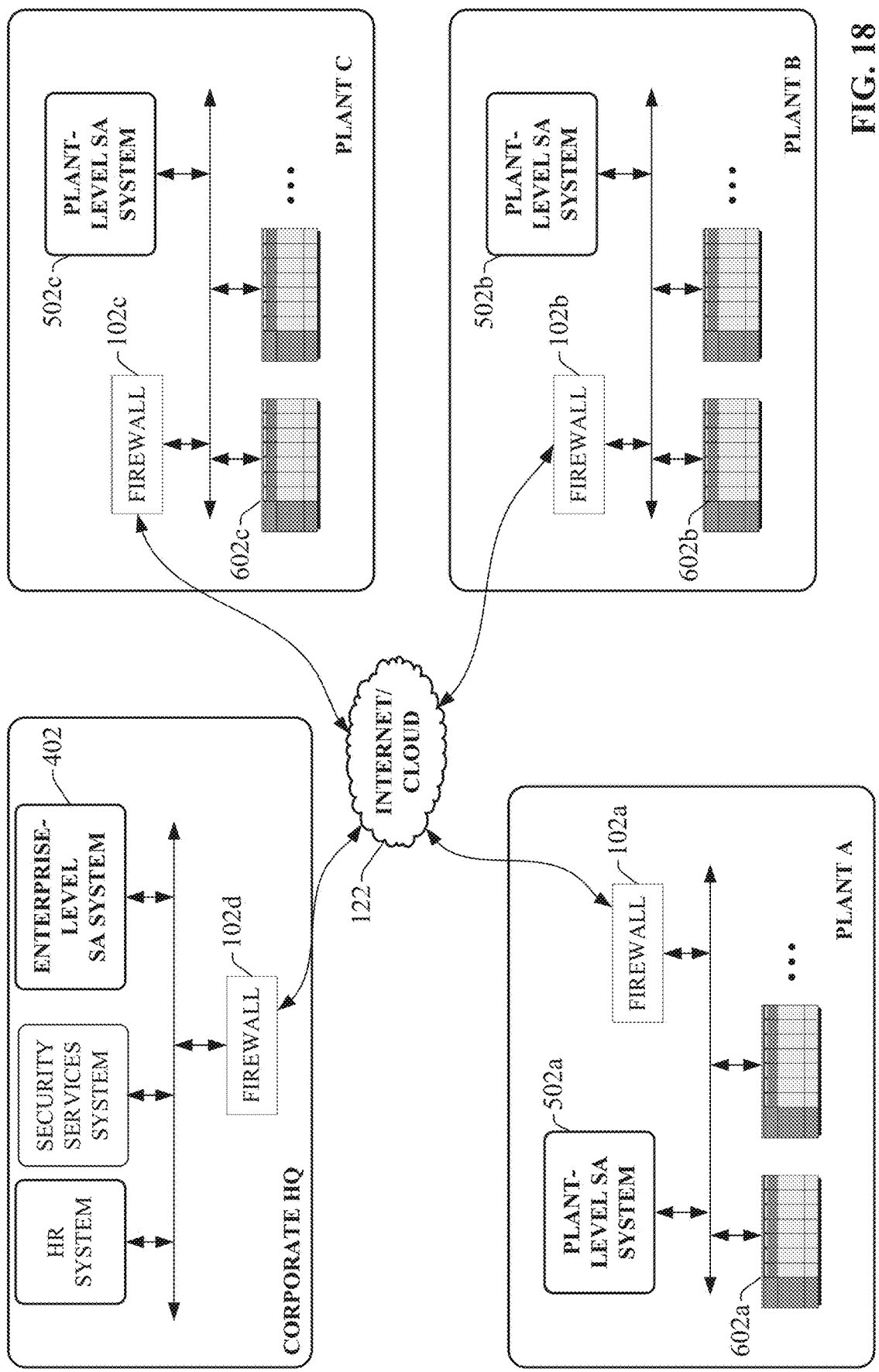
FIG. 18 is a diagram illustrating integration of an identity-based safety system within an industrial enterprise architecture comprising multiple geographically diverse plant facilities and a corporate headquarters facility.

In some implementations, the identity-based industrial safety architecture described herein can be used to enforce role-based security across multiple distributed industrial facilities of an industrial enterprise using a common source of enterprise-level identity and security policy information. FIG. 18 is a diagram illustrating integration of the identity-based safety system within an industrial enterprise architecture comprising multiple geographically diverse plant facilities (Plants A-C) and a corporate headquarters facility. Each plant facility houses one or more automation systems that are monitored and controlled by industrial controllers 602. As described in previous examples, enterprise-level employee and security policy data is maintained at the corporate headquarters in HR and security services systems.

A plant-level SA system 502 is installed at each plant facility, and each plant-level SA system 502 can remotely connect to an enterprise-level SA system 402 that resides at the corporate headquarters. In the illustrated example, the corporate headquarters and each plant facility can securely access a public or semi-public network 122 such as the Internet or a cloud platform via respective firewall devices 102 or other types of secure network infrastructure devices at each facility, allowing the plant-level SA systems 502 to communicate with the enterprise-level SA system 402 through this public or semi-public network 122.

As described in previous examples, enterprise-level SA system 402 can retrieve enterprise-level employee identity and security policy information from corporate systems (e.g., human resources system 104 and security services system 106), generate identity records 424 based on this information, and send the identity records 424 to each of the plant-level SA systems 502 in a secure and SIL-compliant manner. The plant-level SA systems 502 can then use this enterprise-level information as the basis for enforcing plant-level safety policies based on user identity, role, training, etc., as described in previous examples. In this distributed architecture, the corporate systems serve as the sole, central source of identity and security policy information used to enforce identity-based safety at all plant facilities. The particular safety policies enforced at each facility can be customized on the respective plant-level SA systems 502 (e.g., using safety policy data 523) to suit the particular industrial applications and machines operating at the respective facilities.

The identity-based safety system can also be configured to maintain logs of detected safety events or interactions for auditing purposes. This can include recording both successful and unsuccessful attempts to access the automation system or perform a control or safety actions by both authorized and unauthorized users. These events can be logged locally at the industrial device (e.g., controller 602), on the plant-level SA system 502, or at the enterprise-level SA system 402. In addition to recording attempts to access restricted zones or perform restricted control actions, the safety system can also log attempts to change the enterprise-level identity or security policy information from the enterprise-level SA system 402, machine-to-machine interactions (e.g., an attempt by another industrial controller to send a command to controller 602 or another safety device), detailed operator behavior and resulting machine performance, maintenance operations (including downtime due to maintenance), or other such information.

This audit information can be leveraged in various ways. For example, the safety system can be configured to issue notifications to selected administrators, security personnel, or maintenance personnel if the audit information indicates an unauthorized attempt to access or control an automation system. Also, analytic systems can leverage selected sets of the audit information in connection with performing forensic analysis of machine operation.

Embodiments of the identity- and role-based safety systems described herein can beneficially enhance industrial safety systems with user authentication, affording these safety systems a user-appropriate degree of flexibility while remaining in compliance with SIL safety standards. Allowing safety permissives to be configured at a high degree of granularity as a function of user identity or role can potentially improve productivity by reducing occurrences of unnecessary safety system trips, and by simplifying maintenance tasks without sacrificing safety assurances. For example, since the identity-based safety system can discriminate between different humans who interact with the associated automation system and appropriately tune the control and safety system based on a current user's role, the system can allow a qualified service technician to enter a protected work cell and, rather than placing the control machinery within the work cell in a complete safe mode (e.g., a stopped or de-energized state), allow the motors to maintain a reduced safe operating or limited speed state for maintenance and diagnostic purposes.

The approach described herein can integrate user authentication using existing corporate-level employee and security policy data, allowing corporate-level systems without functional safety to serve as the ultimate authority for user identity. The system can dynamically detect changes to a user's corporate identity information and prohibit unvalidated identity information from being introduced into the plant for safety or standard systems without reestablishing the safety assurances. This approach also allows user authentication and access to be managed easily from existing corporate systems.

FIGS. 19-22 illustrate various methodologies in accordance with one or more embodiments of the subject application. While, for purposes of simplicity of explanation, the methodologies shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 19:
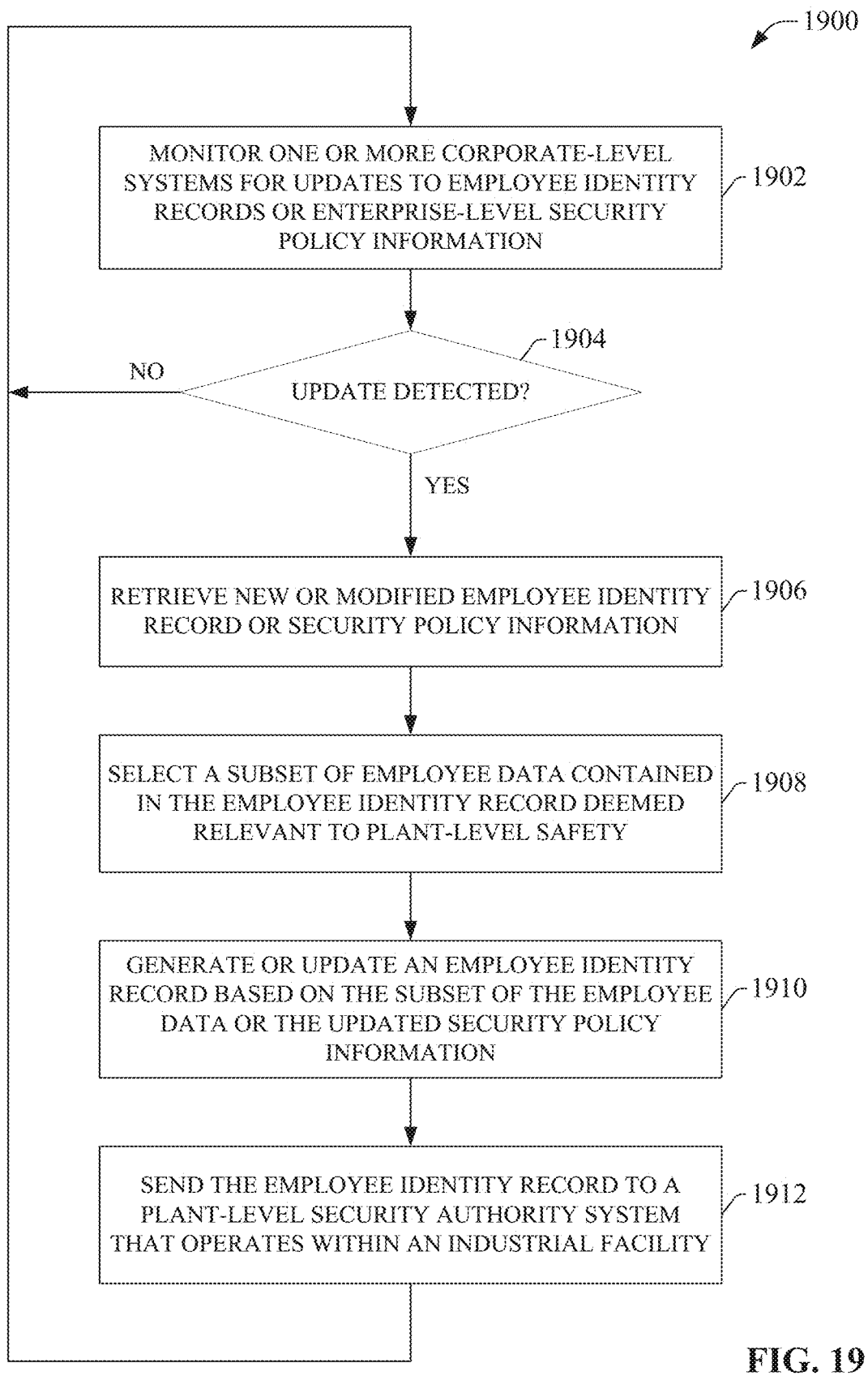
FIG. 19 is a flowchart of an example methodology for processing employee records and security policy data from corporate-level systems of an industrial enterprise for use in functional safety systems on the plant-level of the enterprise.

FIG. 19 illustrates an example methodology 1900 for processing employee records and security policy data from corporate-level systems of an industrial enterprise for use in functional safety systems on the plant-level of the enterprise. Initially, a 1902, one or more corporate-level systems are monitored for updates to employee identity records or enterprise-level security policy information. This monitoring can be performed by an enterprise-level security authority (SA) system that operates at a corporate headquarters of the enterprise and is capable of accessing the identity records and security policy information from relevant corporate-level system (e.g., human resources systems, security services systems, etc.). For example, the employee identity records can comprise information on respective employees of the industrial enterprise, and this information can be maintained by human resources staff in a human resources database. This employee information can include, for example, the employee's name, address, role within the enterprise, work shifts, work locations (e.g., buildings, departments, plant facilities, production areas, etc.), work shifts, training or certifications, or other such information. The security policy information can be maintained as part of a security system that regulates access to buildings that make up the industrial enterprise, and can specify employees who are permitted to enter each building, or particular areas within a given building.

At 1904, a determination is made as to whether an update to the employee identity records or enterprise-level security policy information is detected based on the monitoring performed at step 1902. The update may be originated, for example, by human resources personnel as part of the enterprise's protocol for maintaining updated records for all employees. The update may comprise addition of a new record for a new employee or modification of an existing employee's record to reflect a change in the employee's status (e.g., transfer to a new department or facility, a new certification or training experience, a change in the user's role, etc.).

If no updates are detected (NO at step 1904), the methodology returns to step 1902 and monitoring continues. Alternatively, if an update is detected (YES at step 1904), the methodology proceeds to step 1906, where the new or modified employee identity record or security policy information is retrieved from the corporate-level systems on which the change occurs.

At 1908, if the retrieved updates comprise a new or modified employee identity record, a subset of employee data contained in the employee identity records deemed relevant to functional safety on the plant-floor level is selected by the enterprise-level SA system. For example, the SA system can perform filtering on the employee data to remove data items that are not relevant to functional safety considerations (e.g., the employee's home address, hire date, etc.), and to maintain data items that can be relevant to determinations of whether the employee should be permitted access to an automation system on the plant floor, and a scope of the permitted access (e.g., the employee's role, training, etc.).

At 1910, the enterprise-level SA system generates or updates an employee identity record based on the subset of the employee data selected at step 1908 and/or the updated security policy information. The employee identity record comprises the selected subset of employee data, and any enterprise-level security privileges (e.g., building or area access privileges) defined for the employee by the security policy information. At 1912, the employee identity record is sent to a plant-level SA system that operates within an industrial facility of the enterprise. The plant-level SA system leverage information in the employee identity record to enforce role-based or identity-based safety for one or more industrial control and safety systems that operate in the plant facility.

Figure 20:
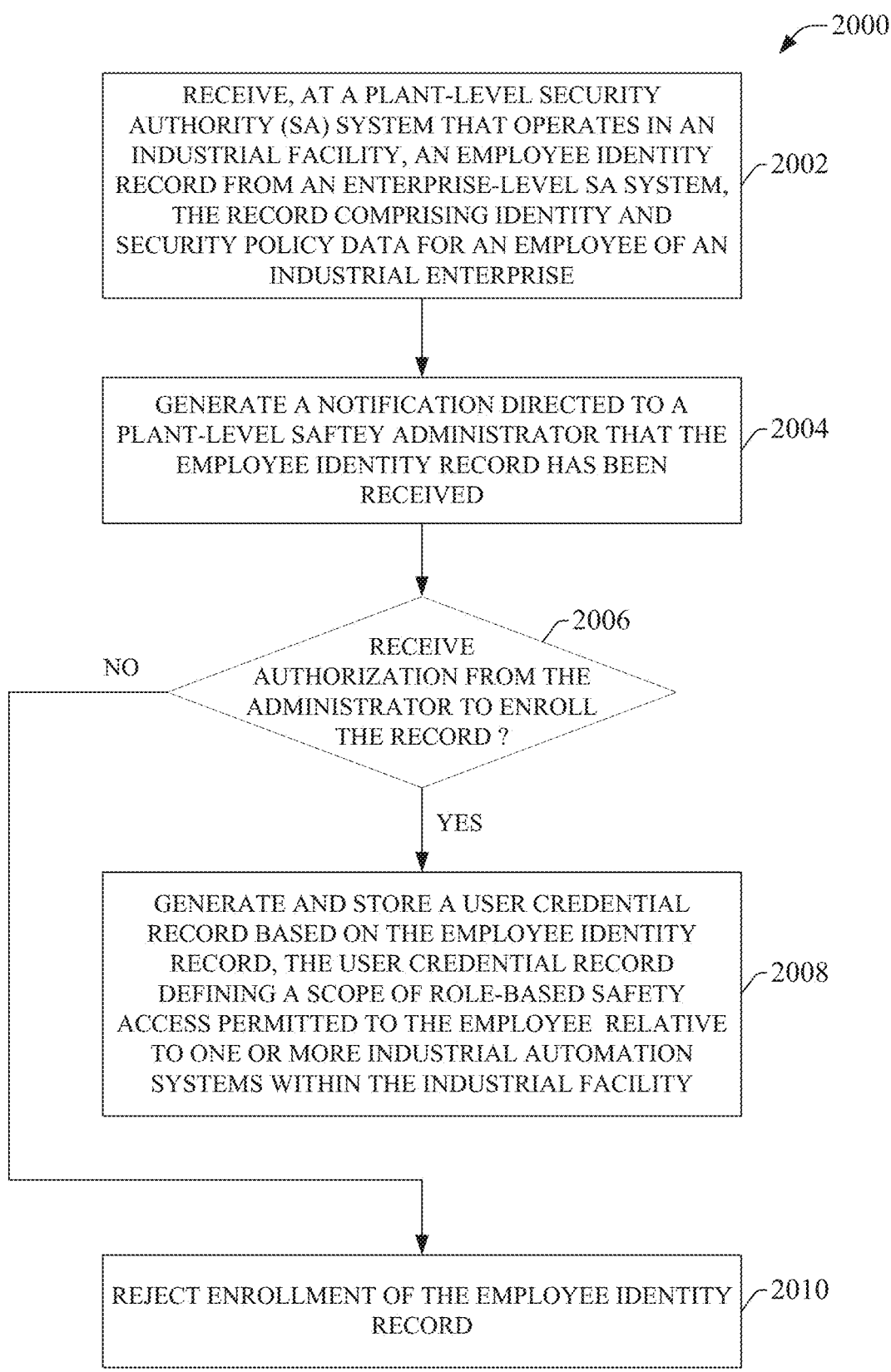
FIG. 20 is a flowchart of an example methodology for enrolling employee identity and security policy information received from an enterprise or corporate level of an industrial enterprise in a plant-level security authority system for use in managing identity-based or role-based functional safety on the plant floor.

FIG. 20 illustrates an example methodology 2000 for enrolling employee identity and security policy information received from an enterprise or corporate level of an industrial enterprise in a plant-level security authority system for use in managing identity-based or role-based functional safety on the plant floor. Initially, at 2002, an employee identity record from an enterprise-level SA system is received at a plant-level SA system that operates in an industrial facility. The employee identity record can comprise identity and security policy information for an employee of the industrial enterprise, and can be generated and sent to the plant-level SA system using methodology 1900 illustrated in FIG. 19.

At 2004, a notification is generated by the plant-level SA system and directed to a plant-level safety administrator, the notification indicating that the employee identity record has been received. At 2006, a determination is made as to whether authorization to enroll the employee identity record is received from the safety administrator. If the authorization is received (YES at step 2006), the methodology proceeds to step 2008, where a user credential record is generated and stored by the plant-level SA system based on the employee identity record. The user credential record defines a scope of role-based safety access permitted to the employee relative to one or more industrial automation systems within the industrial facility. In some embodiments, the plant-level SA system can determine the permitted scope of safety access to be granted to the user based on information about the employee contained in the employee identity record (e.g., role, assigned plant facility and/or production area, training, etc.) as well as defined safety policies that define what control actions are permitted to respective different roles.

If the authorization to enroll the employee identity record is not received, but instead the employee identity record is rejected by the administrator (NO at step 2006), the methodology proceeds to step 2010, where enrollment of the received employee identity record is rejected.

Figure 21:
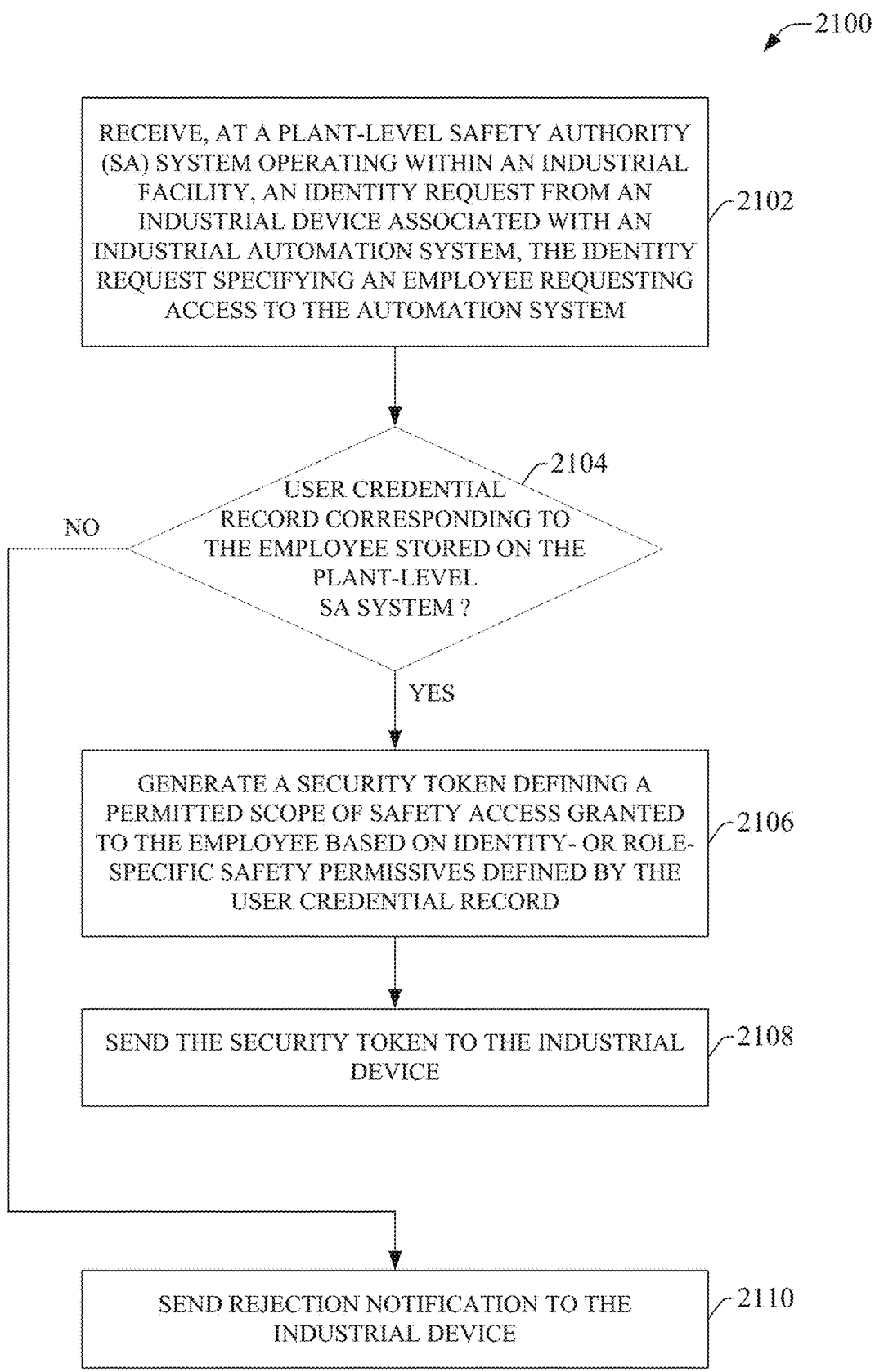
FIG. 21 is a flowchart of an example methodology for processing an identity request received from an industrial device.

FIG. 21 illustrates an example methodology 2100 for processing an identity request received from an industrial device. Initially, at 2102, an identity request is received at a plant-level safety authority system from an industrial device associated with an industrial automation system. The identity request specifies an employee requesting access to the automation system. At 2104, a determination is made as to whether a user credential record corresponding to the employee identified by the identity request is stored on the plant-level SA system. In this regard, the plant-level SA system can store a set of user credential records—generated using methodology 2000 illustrated in FIG. 20—corresponding to respective employees of the industrial enterprise having some degree of access permission to interact with the automation system.

If no user credential record corresponding to the identity specified by the identity request is found by the plant-level SA system (NO at step 2104), the methodology proceeds to step 2110, where the SA system sends a rejection notification to the industrial device. Alternatively, if a user credential record indicating a degree of permitted interaction with the automation system exists for the identity (YES at step 2104), the methodology proceeds to step 2106, where a security token defining a permitted scope of safety access granted to the identified employee based on identity- or role-specific safety permissives defined by the employee's user credential record. The defined scope of permitted access can specify, for example, control actions that are permitted to be initiated by the identified employee, monitored zones near the automation system that the employee may enter without causing the automation system's safety system to stop the controlled machinery, or other such permitted interactions. At 2108, the security token generated at step 2106 is sent to the industrial device to facilitate enforcement of the permitted safety permissives.

Figure 22:
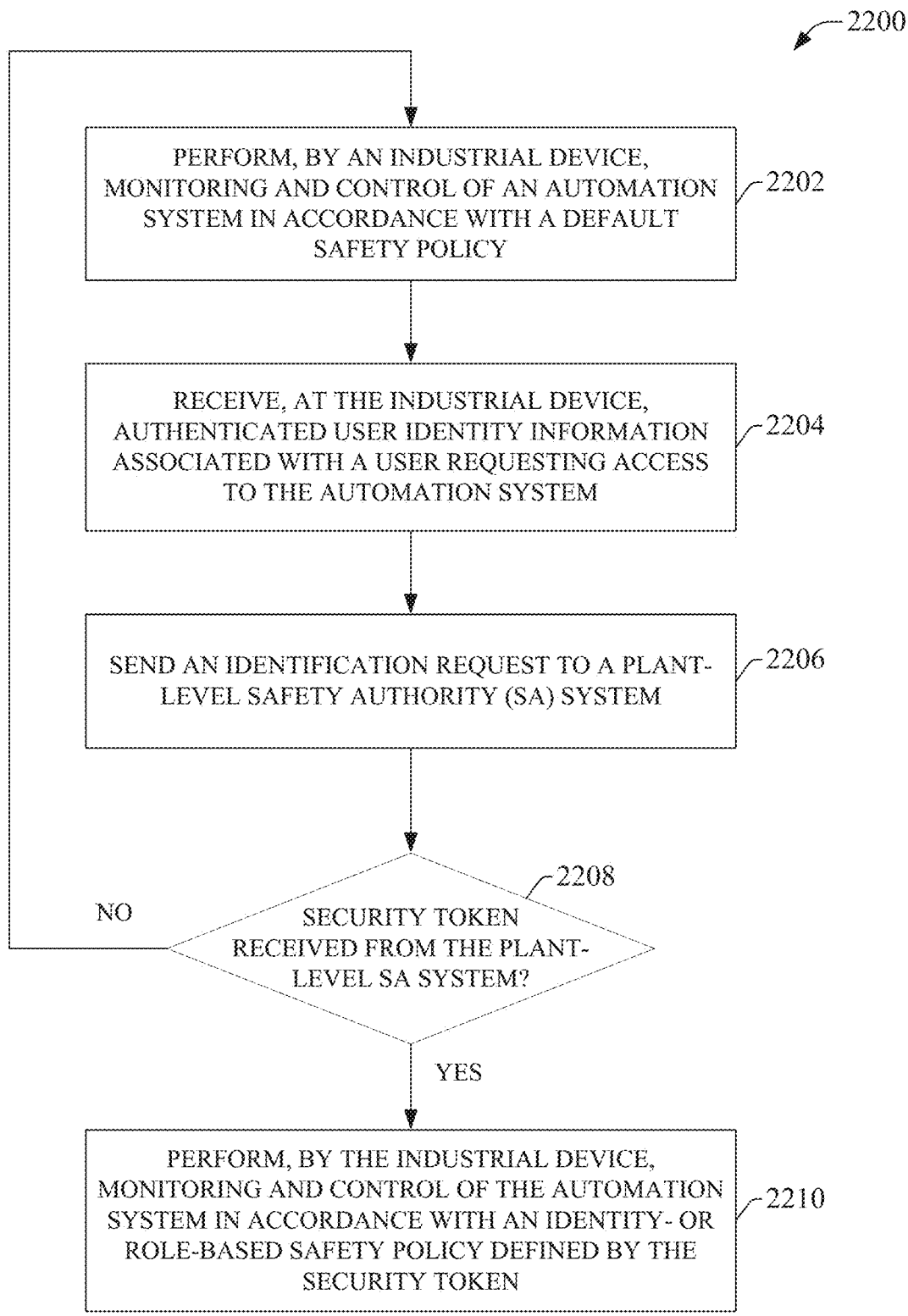
FIG. 22 is a flowchart of an example methodology for enforcing role- or identity-based functional safety by an industrial device.

FIG. 22 illustrates an example methodology 2200 for enforcing role- or identity-based functional safety by an industrial device. Initially, at 2202, an industrial controller or other type of industrial device performs monitoring and control of an automation system in accordance with a default safety policy. The default safety policy may be a safety strategy considered safe for all users regardless of role or qualifications. For example, the default may specify that human intrusion into any protected area near the automation system is to cause the controlled hazardous machinery to be de-energized by the safety system, or that no protected control interactions (e.g., initiation of a machine start, transitioning to a particular operating mode, etc.) are to be permitted unless the user provides a proof of identity associated with suitable safety credentials.

At 2204, authenticated user identity information is received at the industrial device. The identity information can be submitted by a user requesting access to the automation system. The identity information can be collected in any suitable format, including but not limited to identity data electronically stored on a badge and read by a badge reader, biometric data (e.g., fingerprint scanning, iris scanning, facial recognition, etc.), username and password entry, or other type of verifiable user identity information. At 2206, in response to receipt of the identity information at step 2204, the industrial device sends an identification request to a plant-level SA system.

At 2208, a determination is made as to whether a security token is received from the plant-level SA system in response to the identification request. The plant-level SA system can process the identity request and return a security token using methodology 2100 depicted in FIG. 21. As noted in that methodology, the security token defines a permitted scope of access to the automation system granted to the user specified by the identity request. If the security toke is received (YES at step 2210), the methodology proceeds to step 2210, where the industrial device performs monitoring and control of the automation system in accordance with the identity- or role-based safety policy defined by the security token. This can include, for example, permitting or restricting selected control actions that can be initiated by the user, permitting or denying the user the ability to enter a protected area near the machines controlled by the system without causing the safety system to disconnect power from the machines, or other such permissives.

If the security token is not received (NO at step 2208), the methodology returns to step 2202, where the industrial device continues monitoring and controlling the automation system in accordance with the default safety policy.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 23:
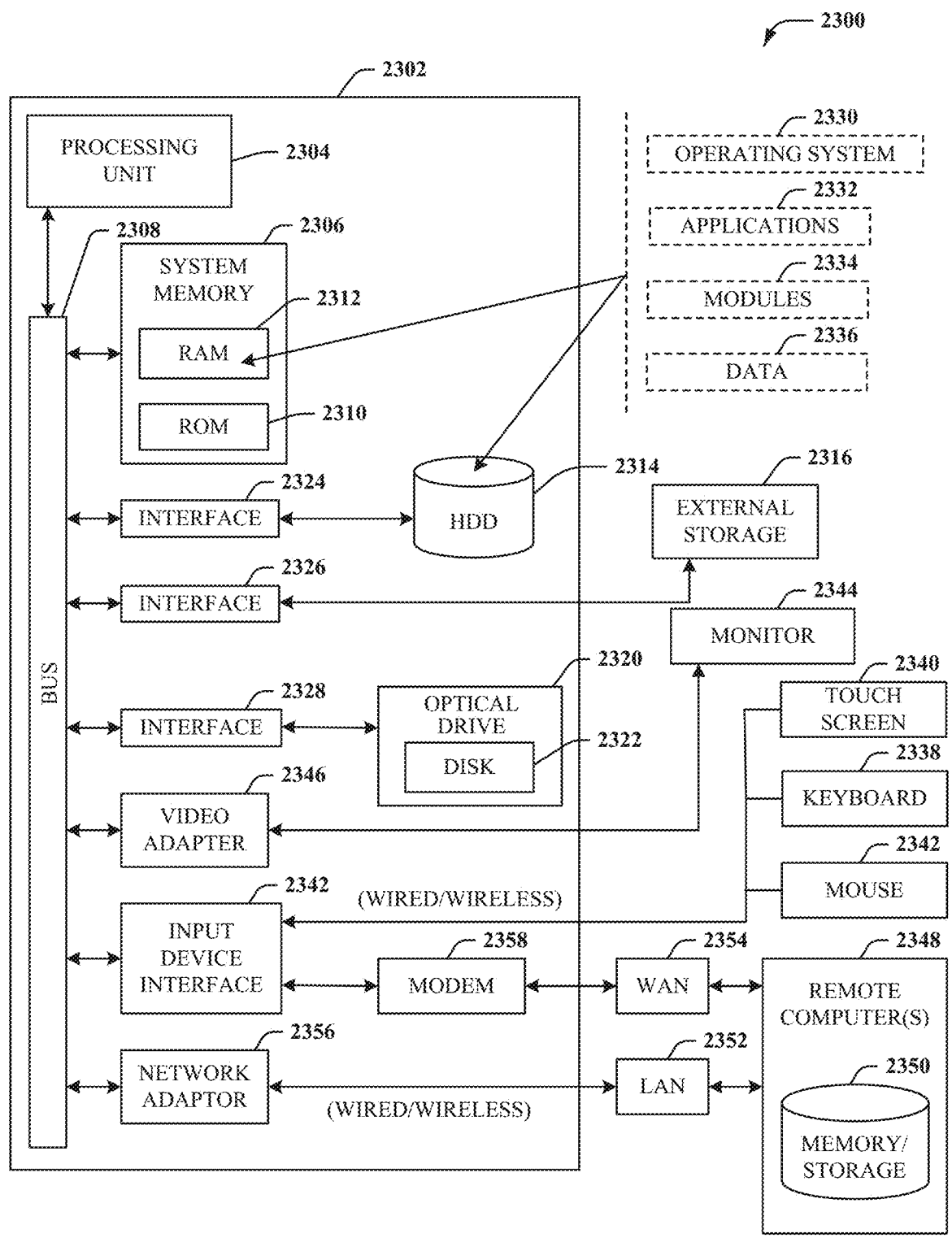
FIG. 23 is an example computing environment.
Figure 24:
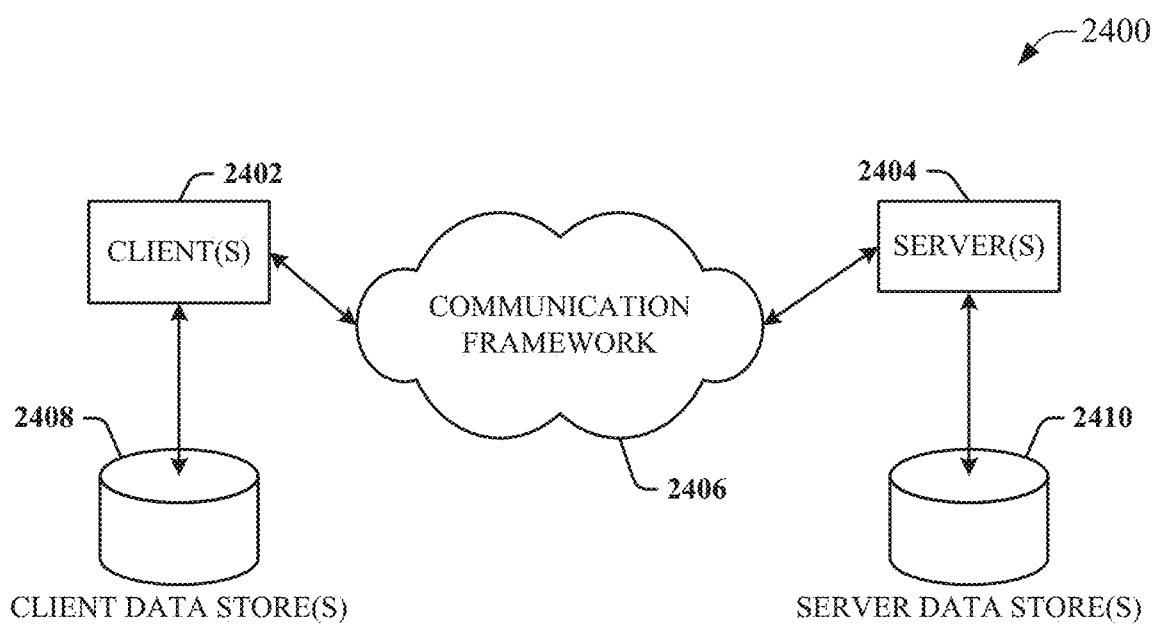
FIG. 24 is an example networking environment.

In order to provide a context for the various aspects of the disclosed subject matter, FIGS. 23 and 24 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 23 the example environment 2300 for implementing various embodiments of the aspects described herein includes a computer 2302, the computer 2302 including a processing unit 2304, a system memory 2306 and a system bus 2308. The system bus 2308 couples system components including, but not limited to, the system memory 2306 to the processing unit 2304. The processing unit 2304 can be any of various commercially available processors. Dual microprocessors and other multi-processor architectures can also be employed as the processing unit 2304.

The system bus 2308 can be any of several types of bus structure that can further interconnect to a memory bus (with or without a memory controller), a peripheral bus, and a local bus using any of a variety of commercially available bus architectures. The system memory 2306 includes ROM 2310 and RAM 2312. A basic input/output system (BIOS) can be stored in a non-volatile memory such as ROM, erasable programmable read only memory (EPROM), EEPROM, which BIOS contains the basic routines that help to transfer information between elements within the computer 2302, such as during startup. The RAM 2312 can also include a high-speed RAM such as static RAM for caching data.

The computer 2302 further includes an internal hard disk drive (HDD) 2314 (e.g., EIDE, SATA), one or more external storage devices 2316 (e.g., a magnetic floppy disk drive (FDD) 2316, a memory stick or flash drive reader, a memory card reader, etc.) and an optical disk drive 2320 (e.g., which can read or write from a CD-ROM disc, a DVD, a BD, etc.). While the internal HDD 2314 is illustrated as located within the computer 2302, the internal HDD 2314 can also be configured for external use in a suitable chassis (not shown). Additionally, while not shown in environment 2300, a solid state drive (SSD) could be used in addition to, or in place of, an HDD 2314. The HDD 2314, external storage device(s) 2316 and optical disk drive 2320 can be connected to the system bus 2308 by an HDD interface 2324, an external storage interface 2326 and an optical drive interface 2328, respectively. The interface 2324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2312, including an operating system 2330, one or more application programs 2333, other program modules 2334 and program data 2336. All or portions of the operating system, applications, modules, and/or data can also be cached in the RAM 2312. The systems and methods described herein can be implemented utilizing various commercially available operating systems or combinations of operating systems.

Computer 2302 can optionally comprise emulation technologies. For example, a hypervisor (not shown) or other intermediary can emulate a hardware environment for operating system 2330, and the emulated hardware can optionally be different from the hardware illustrated in FIG. 23. In such an embodiment, operating system 2330 can comprise one virtual machine (VM) of multiple VMs hosted at computer 2302. Furthermore, operating system 2330 can provide runtime environments, such as the Java runtime environment or the .NET framework, for application programs 2333. Runtime environments are consistent execution environments that allow application programs 2333 to run on any operating system that includes the runtime environment. Similarly, operating system 2330 can support containers, and application programs 2333 can be in the form of containers, which are lightweight, standalone, executable packages of software that include, e.g., code, runtime, system tools, system libraries and settings for an application.

Further, computer 2302 can be enable with a security module, such as a trusted processing module (TPM). For instance with a TPM, boot components hash next in time boot components, and wait for a match of results to secured values, before loading a next boot component. This process can take place at any layer in the code execution stack of computer 2302, e.g., applied at the application execution level or at the operating system (OS) kernel level, thereby enabling security at any level of code execution.

A user can enter commands and information into the computer 2302 through one or more wired/wireless input devices, e.g., a keyboard 2338, a touch screen 2340, and a pointing device, such as a mouse 2342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2304 through an input device interface 2344 that can be coupled to the system bus 2308, but can be connected by other interfaces, such as a parallel port, an IEEE 1394 serial port, a game port, a USB port, an IR interface, a BLUETOOTH® interface, etc.

A monitor 2344 or other type of display device can be also connected to the system bus 2308 via an interface, such as a video adapter 2346. In addition to the monitor 2344, a computer typically includes other peripheral output devices (not shown), such as speakers, printers, etc.

The computer 2302 can operate in a networked environment using logical connections via wired and/or wireless communications to one or more remote computers, such as a remote computer(s) 2348. The remote computer(s) 2348 can be a workstation, a server computer, a router, a personal computer, portable computer, microprocessor-based entertainment appliance, a peer device or other common network node, and typically includes many or all of the elements described relative to the computer 2302, although, for purposes of brevity, only a memory/storage device 2350 is illustrated. The logical connections depicted include wired/wireless connectivity to a local area network (LAN) 2352 and/or larger networks, e.g., a wide area network (WAN) 2354. Such LAN and WAN networking environments are commonplace in offices and companies, and facilitate enterprise-wide computer networks, such as intranets, all of which can connect to a global communications network, e.g., the Internet.

When used in a LAN networking environment, the computer 2302 can be connected to the local network 2352 through a wired and/or wireless communication network interface or adapter 2356. The adapter 2356 can facilitate wired or wireless communication to the LAN 2352, which can also include a wireless access point (AP) disposed thereon for communicating with the adapter 2356 in a wireless mode.

When used in a WAN networking environment, the computer 2302 can include a modem 2358 or can be connected to a communications server on the WAN 2354 via other means for establishing communications over the WAN 2354, such as by way of the Internet. The modem 2358, which can be internal or external and a wired or wireless device, can be connected to the system bus 2308 via the input device interface 2342. In a networked environment, program modules depicted relative to the computer 2302 or portions thereof, can be stored in the remote memory/storage device 2350. It will be appreciated that the network connections shown are example and other means of establishing a communications link between the computers can be used.

When used in either a LAN or WAN networking environment, the computer 2302 can access cloud storage systems or other network-based storage systems in addition to, or in place of, external storage devices 2316 as described above. Generally, a connection between the computer 2302 and a cloud storage system can be established over a LAN 2352 or WAN 2354 e.g., by the adapter 2356 or modem 2358, respectively. Upon connecting the computer 2302 to an associated cloud storage system, the external storage interface 2326 can, with the aid of the adapter 2356 and/or modem 2358, manage storage provided by the cloud storage system as it would other types of external storage. For instance, the external storage interface 2326 can be configured to provide access to cloud storage sources as if those sources were physically connected to the computer 2302.

The computer 2302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 24 is a schematic block diagram of a sample computing environment 2400 with which the disclosed subject matter can interact. The sample computing environment 2400 includes one or more client(s) 2402. The client(s) 2402 can be hardware and/or software (e.g., threads, processes, computing devices). The sample computing environment 2400 also includes one or more server(s) 2404. The server(s) 2404 can also be hardware and/or software (e.g., threads, processes, computing devices). The servers 2404 can house threads to perform transformations by employing one or more embodiments as described herein, for example. One possible communication between a client 2402 and servers 2404 can be in the form of a data packet adapted to be transmitted between two or more computer processes. The sample computing environment 2400 includes a communication framework 2406 that can be employed to facilitate communications between the client(s) 2402 and the server(s) 2404. The client(s) 2402 are operably connected to one or more client data store(s) 2408 that can be employed to store information local to the client(s) 2402. Similarly, the server(s) 2404 are operably connected to one or more server data store(s) 2410 that can be employed to store information local to the servers 2404.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
an identity provider interface component configured to obtain an identity record from a corporate-level employee information system, the identity record defining at least an identity of an employee of an industrial enterprise and a role of the employee;
an enrollment component configured to, in response to receipt of validation data indicating approval of the identity record, enroll the identity record as a user credential record defining a degree of access to an automation system granted to the employee, wherein the degree of access is at least one of a permission to initiate a machine operating mode of the automation system, a permission to modify a control variable of the automation system, or a permission to physically access a safety zone associated with the automation system without causing an industrial safety system to initiate a safety countermeasure;
a device interface component configured to receive, from an industrial device associated with the automation system, an identity request that specifies an identity of a user attempting to interact with the automation system; and
a security token component configured to, in response to determining that the identity specified by the identity request corresponds to the user credential record, generate a security token that, in response to execution on the industrial device, enforces the degree of access to the automation system defined by the user credential record,
wherein the device interface component is further configured to send the security token to the industrial device.

2. The system of claim 1, wherein
the enrollment component is configured to set the degree of access to the automation system granted to the employee as a function of the role of the employee, and
the role is at least one of an operator, a plant manager, a controls engineer, a maintenance person, a safety supervisor, a member of office staff, or a member of facilities staff.

3. The system of claim 1, wherein
the identity record further defines a security policy applicable to the employee, the security policy defining at least one of a building or an area of the industrial enterprise that the employee is permitted to access, and
the enrollment component is configured to set the degree of access to the automation system granted to the employee based in part on the security policy.

4. The system of claim 1, wherein at least a portion of data included in the identity record is obtained from a human resources system maintained at a corporate level of the industrial enterprise.

5. The system of claim 1, wherein the industrial device generates the identity request based on user identity data obtained via at least one of a badge reader, an iris scanner, a facial recognition system, a fingerprint reader, or a password entry device.

6. The system of claim 1, wherein
the identity provider interface component is configured to remove a portion of employee data included in the identity record prior to enrollment of the identity record as the user credential record, and
the portion of the employee data comprises information about the employee that is not used to determine the degree of access to the automation system granted to the employee.

7. The system of claim 1, wherein the enrollment component is configured to determine the degree of access to the automation system granted to the employee based in part on safety policy data defining degrees of access to the automation system granted to respective different employee roles.

8. The system of claim 1, wherein the security token is configured to cause the industrial device to prevent execution of a control action initiated by the employee in response to determining that the security token prohibits the employee from initiating the control action.

9. The system of claim 2, wherein the enrollment component is configured to set the degree of access to the automation system granted to the employee as a further function of at least one of a certification or a training experience of the employee indicated in the identity record.

10. The system of claim 3, wherein the security policy is retrieved from a corporate-level security services system.

11. A method, comprising:
receiving, by a safety authority system comprising a processor, an identity record retrieved from a corporate-level employee information system, the identity record defining at least an identity of an employee of an industrial enterprise and a role of the employee;
in response to receiving validation data indicating authorization of the identity record, generating, by the safety authority system, a user credential record based on the identity record, wherein the user credential record defines a permitted level of interaction with an automation system granted to the employee, and the permitted level of interaction is at least one of a permission to initiate a machine operating mode of the automation system, a permission to modify a control variable of the automation system, or a permission to physically access a safety zone associated with the automation system without causing an industrial safety system to initiate a safety countermeasure;
receiving, by the safety authority system from an industrial device associated with the automation system, an identity request that specifies an identity of a user requesting to interact with the automation system;
in response to determining that the identity specified by the identity request corresponds to the user credential record, generating, by the safety authority system, a security token that, in response to execution on the industrial device, enforces the permitted level of interaction defined by the user credential record; and
sending, by the safety authority system, the security token to the industrial device.

12. The method of claim 11, wherein
the generating the user credential record comprises determining the permitted level of interaction to be granted to the employee based on the role of the employee, and
the role is at least one of an operator, a plant manager, a controls engineer, a maintenance person, a safety supervisor, a member of office staff, or a member of facilities staff.

13. The method of claim 11, wherein the generating the security token comprises:
recording, in the security token, the safety zone that the employee is permitted to physically access.

14. The method of claim 11, wherein the generating the security token further comprises defining the permitted level of interaction with the automation system based on security policy information included in the identity record, the security policy information defining at least one of a building or an area of the industrial enterprise that the employee is permitted to access.

15. The method of claim 11, wherein
the generating the user credential record comprises removing a portion of employee data included in the identity record prior to generation of the user credential record, and
the portion of the employee data comprises information about the employee that is not used to determine the permitted level of interaction to the automation system granted to the employee.

16. The method of claim 11, wherein the generating the user credential record comprises determining the permitted level of interaction with the automation system to be granted to the employee based in part on safety policy data that specifies permitted levels of interaction with the automation system granted to respective different employee roles.

17. The method of claim 12, wherein the generating the user credential record further comprises determining the permitted level of interaction further based on at least one of a certification or a training experience of the employee indicated in the identity record.

18. A non-transitory computer-readable medium having stored thereon instructions that, in response to execution, cause a system comprising a processor to perform operations, the operations comprising:
receiving an identity record obtained from a corporate-level human resources system, the identity record defining at least an identity of an employee of an industrial enterprise and a role of the employee;
in response to receiving validation data indicating that the identity record has been granted administrator approval, generating a user credential record based on the identity record, wherein the user credential record defines a degree of interaction with the automation system granted to the employee, and the degree of interaction is at least one of a permission to initiate a machine operating mode of the automation system, a permission to modify a control variable of the automation system, or a permission to physically access a safety zone associated with the automation system without causing an industrial safety system to initiate a safety countermeasure;
receiving, from an industrial device associated with the automation system, an identity request that includes an identity of a user attempting to interact with the automation system;
in response to determining that the identity specified by the identity request corresponds to the user credential record, generating a security token that, in response to execution on the industrial device, enforces the degree of interaction defined by the user credential record; and
sending the security token to the industrial device.

19. The non-transitory computer-readable medium of claim 18, wherein the generating the user credential record comprises determining the degree of interaction based on the role of the employee specified in the identity record.

20. The non-transitory computer-readable medium of claim 18, wherein the generating of the user credential record comprises determining the degree of interaction based on at least one of a certification or a training experience of the employee indicated in the identity record.

* * * * *